(12) United States Patent
Gergets et al.

(10) Patent No.: US 7,905,640 B2
(45) Date of Patent: Mar. 15, 2011

(54) LIGHT BAR AND METHOD FOR MAKING

(75) Inventors: Paul M. Gergets, Saint John, IN (US);
Vince S. Fleszewski, Crown Point, IN (US); Allan J. Mostello, Crown Point, IN (US)

(73) Assignee: Federal Signal Corporation, Oakbrook, IL (US)

( * ) Notice: Subject to any disclaimer, the term of this patent is extended or adjusted under 35 U.S.C. 154(b) by 0 days.

(21) Appl. No.: 12/350,506

(22) Filed: Jan. 8, 2009

(65) Prior Publication Data
US 2009/0141511 A1 Jun. 4, 2009

Related U.S. Application Data

(63) Continuation of application No. 11/394,752, filed on Mar. 31, 2006, now Pat. No. 7,476,013.

(51) Int. Cl.
*B60Q 1/00* (2006.01)
(52) U.S. Cl. ......... 362/493; 362/646; 362/542; 362/543
(58) Field of Classification Search .................. 362/493, 362/646, 520, 521, 542, 543, 544
See application file for complete search history.

(56) References Cited

U.S. PATENT DOCUMENTS

| | | | |
|---|---|---|---|
| 4,155,042 A | 5/1979 | Permut et al. | |
| 4,633,229 A | 12/1986 | Iacono et al. | |
| 4,722,030 A | 1/1988 | Bowden | |
| 4,789,904 A | 12/1988 | Peterson | |
| 5,185,697 A | 2/1993 | Jacobs et al. | |
| 5,487,069 A | 1/1996 | O'Sullivan et al. | |
| 5,539,398 A | 7/1996 | Hall et al. | |
| 5,567,036 A * | 10/1996 | Theobald et al. | ............. 362/485 |
| 5,572,201 A | 11/1996 | Graham et al. | |
| 5,602,739 A | 2/1997 | Haagenstad et al. | |

(Continued)

FOREIGN PATENT DOCUMENTS
BE 1006768 A6 12/1994
(Continued)

OTHER PUBLICATIONS

Morris, Tom, "IRC's Anotherm™ PC Boards Eliminate Heatsinks for Automotive LED Applications", *TT electronics*, Jun. 17, 2003 (2 page).

(Continued)

*Primary Examiner* — Evan Dzierzynski
(74) *Attorney, Agent, or Firm* — Leydig, Voit & Mayer, Ltd.

(57) ABSTRACT

A light bar is described that is of a modular construction based on one or more large circuit boards that are populated with light beam assemblies and then fastened to an interior space of the light bar housing. Keys that automatically align the light beam assemblies on each of the boards precisely control placement of the assemblies on the board. In turn, each of the boards is keyed to the interior of the light bar housing so that when the board is fastened to the housing the light beam assemblies are automatically registered into alignment with the lenses in the housing so that the beams from the assemblies are properly oriented. The light bar is inexpensive to fabricate and can be assembled quickly and reliably, yet it provides for a high degree of customization, which is a requirement in the emergency vehicle lighting industry.

16 Claims, 12 Drawing Sheets

U.S. PATENT DOCUMENTS

| | | | |
|---|---|---|---|
| 5,689,233 A | 11/1997 | Kurisu et al. | |
| 5,815,417 A | 9/1998 | Orr et al. | |
| 5,826,180 A | 10/1998 | Golan | |
| 5,861,959 A | 1/1999 | Barak | |
| 5,884,997 A | 3/1999 | Stanuch et al. | |
| 5,887,139 A | 3/1999 | Madison, Jr. et al. | |
| 5,926,113 A | 7/1999 | Jones et al. | |
| 5,937,029 A | 8/1999 | Yosef | |
| 5,986,575 A | 11/1999 | Jones et al. | |
| 6,046,824 A | 4/2000 | Barak | |
| 6,081,191 A | 6/2000 | Green et al. | |
| 6,100,801 A | 8/2000 | Plummer | |
| 6,112,088 A | 8/2000 | Haartsen | |
| 6,149,288 A * | 11/2000 | Huang | 362/545 |
| 6,154,787 A | 11/2000 | Urevig et al. | |
| 6,161,066 A | 12/2000 | Wright et al. | |
| 6,167,036 A | 12/2000 | Beven | |
| 6,169,476 B1 | 1/2001 | Flanagan | |
| 6,188,939 B1 | 2/2001 | Morgan et al. | |
| 6,192,232 B1 | 2/2001 | Iseyama | |
| 6,243,026 B1 | 6/2001 | Jones et al. | |
| 6,249,812 B1 | 6/2001 | Cromer et al. | |
| 6,330,025 B1 | 12/2001 | Arazi et al. | |
| 6,411,874 B2 | 6/2002 | Morgan et al. | |
| 6,437,692 B1 | 8/2002 | Petite et al. | |
| 6,474,557 B2 | 11/2002 | Mullins et al. | |
| 6,542,602 B1 | 4/2003 | Elazar | |
| 6,564,342 B2 | 5/2003 | Landan | |
| 6,567,747 B1 | 5/2003 | Lange et al. | |
| 6,574,561 B2 | 6/2003 | Alexander et al. | |
| 6,624,750 B1 | 9/2003 | Marman et al. | |
| 6,641,284 B2 | 11/2003 | Stopa et al. | |
| 6,747,557 B1 | 6/2004 | Petite et al. | |
| 6,762,686 B1 | 7/2004 | Tabe | |
| 6,856,343 B2 | 2/2005 | Arazi et al. | |
| 6,868,340 B2 | 3/2005 | Alexander et al. | |
| 6,891,838 B1 | 5/2005 | Petite et al. | |
| 6,914,533 B2 | 7/2005 | Petite | |
| 6,930,596 B2 | 8/2005 | Kulesz et al. | |
| 6,942,360 B2 | 9/2005 | Chou et al. | |
| 6,959,079 B2 | 10/2005 | Elazar | |
| 6,966,682 B2 | 11/2005 | Frank et al. | |
| 6,976,769 B2 | 12/2005 | McCullough et al. | |
| 6,982,518 B2 | 1/2006 | Chou et al. | |
| 6,999,876 B2 | 2/2006 | Lambert et al. | |
| 7,010,106 B2 | 3/2006 | Gritzer et al. | |
| 7,010,109 B2 | 3/2006 | Gritzer et al. | |
| 7,015,806 B2 | 3/2006 | Naidoo et al. | |
| 7,016,478 B2 | 3/2006 | Potorny et al. | |
| 7,016,647 B2 | 3/2006 | Albert et al. | |
| 7,034,678 B2 | 4/2006 | Burkley et al. | |
| 7,044,616 B2 | 5/2006 | Shih | |
| 7,057,517 B1 | 6/2006 | Convery | |
| 7,058,710 B2 | 6/2006 | McCall et al. | |
| 7,065,445 B2 | 6/2006 | Thayer et al. | |
| 7,070,418 B1 * | 7/2006 | Wang | 439/56 |
| 7,080,544 B2 | 7/2006 | Stepanik et al. | |
| 7,091,852 B2 | 8/2006 | Mason et al. | |
| 7,103,511 B2 | 9/2006 | Petite | |
| 7,148,803 B2 | 12/2006 | Bandy et al. | |
| 7,158,026 B2 | 1/2007 | Feldkamp et al. | |
| 7,240,328 B2 | 7/2007 | Beckett et al. | |
| 7,250,853 B2 | 7/2007 | Flynn | |
| 7,281,818 B2 * | 10/2007 | You et al. | 362/241 |
| 7,295,128 B2 | 11/2007 | Petite | |
| 7,305,082 B2 | 12/2007 | Elazar et al. | |
| 7,319,397 B2 | 1/2008 | Chung et al. | |
| 7,333,445 B2 | 2/2008 | Ilan et al. | |
| 7,346,186 B2 | 3/2008 | Sharoni et al. | |
| 7,386,105 B2 | 6/2008 | Wasserblat et al. | |
| 7,391,299 B2 | 6/2008 | Bender et al. | |
| 7,474,633 B2 | 1/2009 | Halbraich et al. | |
| 7,476,013 B2 | 1/2009 | Gergets et al. | |
| 7,480,501 B2 | 1/2009 | Petite | |
| 7,526,322 B2 | 4/2009 | Whistler | |
| 2001/0024163 A1 | 9/2001 | Petite | |
| 2002/0019725 A1 | 2/2002 | Petite | |
| 2002/0024424 A1 | 2/2002 | Burns et al. | |
| 2002/0071268 A1 * | 6/2002 | Pederson | 362/35 |
| 2002/0112026 A1 | 8/2002 | Fridman et al. | |
| 2002/0116242 A1 | 8/2002 | Vercellone et al. | |
| 2002/0181232 A1 | 12/2002 | Martineau | |
| 2003/0028536 A1 | 2/2003 | Singh et al. | |
| 2003/0061323 A1 | 3/2003 | East et al. | |
| 2003/0069688 A1 | 4/2003 | Mosis | |
| 2003/0078029 A1 | 4/2003 | Petite | |
| 2003/0095688 A1 | 5/2003 | Kirmuss | |
| 2003/0141990 A1 | 7/2003 | Coon | |
| 2004/0044553 A1 | 3/2004 | Lambert et al. | |
| 2004/0049345 A1 | 3/2004 | McDonough et al. | |
| 2004/0057410 A1 | 3/2004 | Kaipiainen et al. | |
| 2004/0070515 A1 | 4/2004 | Burkley et al. | |
| 2004/0114391 A1 | 6/2004 | Watkins et al. | |
| 2004/0137768 A1 * | 7/2004 | Haehn et al. | 439/76.1 |
| 2004/0142678 A1 | 7/2004 | Krasner | |
| 2004/0145481 A1 | 7/2004 | Dilbeck et al. | |
| 2004/0183687 A1 | 9/2004 | Petite et al. | |
| 2004/0189490 A1 | 9/2004 | Halishak | |
| 2004/0193740 A1 | 9/2004 | Kasmirsky | |
| 2004/0246144 A1 | 12/2004 | Siegel et al. | |
| 2005/0001720 A1 | 1/2005 | Mason et al. | |
| 2005/0018622 A1 | 1/2005 | Halbraich et al. | |
| 2005/0034075 A1 | 2/2005 | Riegelman et al. | |
| 2005/0047167 A1 | 3/2005 | Pederson et al. | |
| 2005/0109394 A1 | 5/2005 | Anderson | |
| 2005/0123115 A1 | 6/2005 | Gritzer et al. | |
| 2005/0134283 A1 | 6/2005 | Potempa | |
| 2005/0151642 A1 | 7/2005 | Tupler et al. | |
| 2005/0174229 A1 | 8/2005 | Feldkamp et al. | |
| 2005/0176403 A1 | 8/2005 | Lalos | |
| 2005/0190055 A1 | 9/2005 | Petite | |
| 2005/0197871 A1 | 9/2005 | Mendonca et al. | |
| 2005/0201397 A1 | 9/2005 | Petite | |
| 2005/0219044 A1 | 10/2005 | Douglass et al. | |
| 2005/0239477 A1 | 10/2005 | Kim et al. | |
| 2005/0242969 A1 * | 11/2005 | Deutsch et al. | 340/815.45 |
| 2005/0243867 A1 | 11/2005 | Petite | |
| 2005/0245232 A1 | 11/2005 | Jakober et al. | |
| 2005/0258942 A1 | 11/2005 | Manasseh et al. | |
| 2005/0275549 A1 | 12/2005 | Barclay et al. | |
| 2005/0282518 A1 | 12/2005 | D'Evelyn et al. | |
| 2006/0002372 A1 | 1/2006 | Smith | |
| 2006/0009190 A1 | 1/2006 | Laliberte | |
| 2006/0045185 A1 | 3/2006 | Kiryati et al. | |
| 2006/0059139 A1 | 3/2006 | Robinson | |
| 2006/0061997 A1 * | 3/2006 | Lin | 362/294 |
| 2006/0068752 A1 | 3/2006 | Lin et al. | |
| 2006/0071775 A1 | 4/2006 | Otto et al. | |
| 2006/0092043 A1 | 5/2006 | Lagassey | |
| 2006/0109113 A1 | 5/2006 | Reyes et al. | |
| 2006/0114853 A1 | 6/2006 | Hasty et al. | |
| 2006/0133624 A1 | 6/2006 | Waserblat et al. | |
| 2006/0136597 A1 | 6/2006 | Shabtai et al. | |
| 2006/0146740 A1 | 7/2006 | Sheynman et al. | |
| 2006/0158329 A1 | 7/2006 | Burkley et al. | |
| 2006/0179064 A1 | 8/2006 | Paz et al. | |
| 2006/0187015 A1 | 8/2006 | Canfield | |
| 2006/0190576 A1 | 8/2006 | Lee et al. | |
| 2006/0227719 A1 | 10/2006 | Halbraich | |
| 2006/0268847 A1 | 11/2006 | Halbraich | |
| 2006/0285665 A1 | 12/2006 | Wasserblat et al. | |
| 2007/0008174 A1 | 1/2007 | Schwartz | |
| 2007/0035962 A1 | 2/2007 | Yurochko | |
| 2007/0041220 A1 * | 2/2007 | Lynch | 362/646 |
| 2007/0083298 A1 | 4/2007 | Pierce et al. | |
| 2007/0122003 A1 | 5/2007 | Dobkin et al. | |
| 2007/0194906 A1 | 8/2007 | Sink | |
| 2007/0195706 A1 | 8/2007 | Sink | |
| 2007/0195939 A1 | 8/2007 | Sink | |
| 2007/0211866 A1 | 9/2007 | Sink | |
| 2007/0213088 A1 | 9/2007 | Sink | |
| 2007/0218910 A1 | 9/2007 | Hill et al. | |
| 2007/0242472 A1 | 10/2007 | Gergets et al. | |
| 2007/0250318 A1 | 10/2007 | Waserblat et al. | |
| 2008/0036583 A1 | 2/2008 | Canfield | |
| 2008/0040110 A1 | 2/2008 | Pereg et al. | |
| 2008/0066184 A1 | 3/2008 | Ben-Ami et al. | |

| | | | |
|---|---|---|---|
| 2008/0144528 | A1 | 6/2008 | Graves et al. |
| 2008/0148397 | A1 | 6/2008 | Litvin et al. |
| 2008/0152122 | A1 | 6/2008 | Idan et al. |
| 2008/0154609 | A1 | 6/2008 | Wasserblat et al. |
| 2008/0181417 | A1 | 7/2008 | Pereg et al. |
| 2008/0189171 | A1 | 8/2008 | Wasserblat |
| 2008/0195385 | A1 | 8/2008 | Pereg et al. |
| 2008/0195387 | A1 | 8/2008 | Zigel et al. |
| 2008/0228296 | A1 | 9/2008 | Eilam et al. |
| 2009/0007263 | A1 | 1/2009 | Frenkel et al. |
| 2009/0012826 | A1 | 1/2009 | Eilam et al. |
| 2009/0033745 | A1 | 2/2009 | Yeredor et al. |
| 2009/0043573 | A1 | 2/2009 | Weinberg et al. |

FOREIGN PATENT DOCUMENTS

| | | |
|---|---|---|
| CA | 2426243 A1 | 10/2003 |
| WO | WO 00/06420 A1 | 2/2000 |
| WO | WO 00/21053 A1 | 4/2000 |
| WO | WO 00/55825 | 9/2000 |
| WO | WO 03/023729 A1 | 3/2003 |
| WO | WO 03/067884 A1 | 8/2003 |
| WO | WO 2004/010398 A1 | 1/2004 |
| WO | WO 2004/038594 A1 | 5/2004 |

OTHER PUBLICATIONS

Article entitled: "Surface Mount LEDs: The Winding Road to Today's Solutions", *Dialight, The Worldwide Leader in LED Technology*, Copyright 2005 (4 pages).
Morris, Tom, "Aluminum Substrates Make Light Work Of Visible LED Circuits", *Canadian Electronics Buyer's Guide*, Mar. 3, 2006 (2 pages).
News Release entitled: "Substrate Solves Power LED Thermal Problems", *TT Electronics Welwyn Components*, Apr. 15, 2004 (2 page).
Product News entitled: "Aluminum Substrate PCBs eliminate heatsinks in automotive LED Lighting", *Reed Electronics Group*, May 2004 (1 page).
Morris, Tom, "IRC's Anotherm™ Technology Enables LEDs to Operate at Full Power", *TT electronics*, Feb. 15, 2006, ( 3 page).
"Multi Layered Security Framework for Metro-Scale Wi-Fi Networks", A Security White Paper, Tropos Networks (Feb. 2005).
"Network diagnostics: LANQuest announces InterView, the first browser-based proactive network diagnostic center.(Product Announcement)", EDGE: Work-Group Computing Report, v8, p. 28(1)—Feb. 3, 1997.
"New for networks: NetAlarm 2.0 network monitoring. (Meyers and Associates) (Product Announcement)", Newsbytes, pNEW08060022—Aug. 6, 1991.
"PCS: Ortel announces PCS version of revolutionary Series 5800 Fiberoptic Antennas to provide in-building PCS coverage. New application of fiber-optic technology allows PCS operators to compete with the cellular industry (Personal Communications Network )", EDGE, on & about AT&T, v10, n374, p. 24(1)—Sep. 25, 1995.
"Price-Performance Comparison: 3G and Tropos MetroMesh Architecture", A Technology Whitepaper (Apr. 2004).
"Public Safety and Public Access: Granbury, Texas & Frontier Broadband", A Tropos Networks Case Study (Nov. 2005).
"Public Safety: 4.9 GHz Wireless Mesh Networks for Public Safety and First Responders," Firetide Inc., www.firetide.com ( © 2004-2005).
"Senate Approves Nominees for NTIC, NTSB, Saint Lawrence, Seaway, NOAA and USG", United States Senate Committee on Commerce Science and Transportation, Dec. 11, 2006.
"Senate Govt. Affairs Committee ranking Democrat", Communications Daily Jul. 6, 2004 Document Type: Newsletter.
"Spotwave to Launch Home Indoor Wireless Coverage.(launch of wireless communications equipment by Spotwave Wireless Inc.)", eWeek, NA Mar. 14, 2005.
"Understanding Wi-Fi and WiMAX as Metro-Access Solutions", White Paper, Wi-Fi and WiMax Solutions, Intel Corp. (2004).
"Weather Hazards Assessment", United States Department of Commerce, National Oceanic and Atmospheric Administration, Dec. 28, 2006.
"Wireless LAN in Public Safety, 802.11b: Transforming the Way Public Safety Agencies Transfer Information," brochure, www.northropgrummanIT.com, Northrop Grumman Information Technology ( © 2003).
"Wireless LAN Infrastructure Mesh Networks: Capabilities and Benefits: A Farpoint Group White Paper," Document No. FPG 2004-185.1 Farpoint Group (Jul. 2004).
"Wireless world: Ortel announces cutting-edge Series 5800 for in-building cellular coverage using fiber-optic technology. (Product Announcement)", EDGE, on & about AT&T, v10, n341, p. 29(1)—Feb. 6, 1995.
"Wireless: Ortel issued 3 patents for Series 5800 fiberoptics; advanced technology for in-building cellular coverage. (Industry Legal Issue) EDGE", on & about AT&T, v10, n379, p. 11(1)—Oct. 30, 1995.
"WLAN Solutions: TNETW1100B Embedded Single-Chip MAC and Baseband Processor" Texas Instruments Product Bulletin ( © 2002).
Abel, Amee Eisenberg, "World Trade Center bombing underscores need for data-loss prevention. (Brief Article)", Computer Shopper, v13, n7, p. 72(1)—Jul. 1993.
Abstract from Dialog of the article for: Bruzewicz, A.J., "Remote Sensing and GIS for Emergency Management" *Proceedings of the First Federal Geographic Technology Conference, Exposition and DataMart* (Sep. 26-28, 1994).
Abstract from Dialog of the article for: Dong, Pinlian, "Development of a GIS/GPS-based Emergency Response System", *Geomatica*, 59(4), 427-433 (2005).
Abstract from Dialog of the article for: Gadomski, et al, "An Approach to the Intelligent Decision Advisor (IDA) for Emergency Managers" *6th Annual Conference of the International Emergency Management Society* (1999).
Abstract from Dialog of the article for: Gadomski, et al., "Towards Intelligent Decision Support Systems for Emergency Managers: the IDS approach", *International J. of Risk Assessment & Management*, 2(3-4), 224-242 (2001).
Abstract from Dialog of the article for: Gross, "The Design and Management of an International Disaster Information Resource Network (Building an Emergency Lane on the Information Superhighway)," *The International Emergency Management and Engineering Conference 1995* (May 9-12, 1995).
Abstract from Dialog of the article for: Hamit, "Out from R and D: A Net-based Command and Control Virtual Community for Emergency Management", *Advanced Imaging*, 13(2), 81-82 (Feb. 1998).
Abstract from Dialog of the article for: Laben, "Integration of Remote Sensing Data and Geographic Information System Technology for Emergency Managers and Their Applications at the Pacific Disaster Center", *Optical Engineering*, 41(9), 2129-2136 (Sep. 2002).
Airline Alcohol Restriction Unlikely to Generate Sufficient Support Satellite Today Jul. 20, 2001, v. 4, issue 138, Document Type: Newsletter.
"An Introduction to Wireless Mesh Networking" White Paper, Firetide Inc., www.firetide.com (Mar. 2005).
"Broadband Public Safety Data Networks in the 4.9 GHz Band: Potential, Pitfalls & Promise" A Technology Whitepaper, Tropos Networks (Mar. 2004).
"Cisco 3200 Series Wireless and Mobile Router—2.4-GHz and 4.9-GHz Antenna Guide" product reference, Cisco Systems, Inc. (2005).
"Emergency Alert & Notification Solutions for Government and Business" (Homeland Defense Training Conference), Homeland Defense Journal, Jun. 29, 2006.
"Executive Order: Public Alert and Warning System" (Press Release) Jun. 26, 2006.
GSM: Ortel announces GSM & DCS1800 versions of series 5800 for in-building cellular coverage using fiberoptic technology; allows cellular operators to maintain competitive edge by enabling new services & expanding coverage areas Edge On & About AT&T, v10, n376, p. 39(1), Oct. 9, 1995.
Guide Lightbar Guidance Added to Case 1H Line Successful Farming, 101(2), 40A (Feb. 1, 2003).
"Hot Port™ 4.9 GHz Public Safety Mesh Network" brochure, Firetide Inc., www.firetide.com (2005).

"IWCE—Cimarron Technologies" *Mobile Radio Technology*, 21 (3). (Mar. 1, 2003).

Letter to Bryan Boettger from County of Los Angeles Sheriff's Department Headquarters, Monterey Park, CA (Aug. 14, 2007).

"Metro-Scale Mesh Newtorking with Tropos MetroMesh™ Architecture" A Technology Whitepaper, Tropos Networks (Feb. 2005).

"About NiceVision® ", wvvw.nice.com/products/video/nicevision_about.php (Apr. 1, 2009).

Amato, Ivan, "Big Brother Logs On.(increasing surveillance and lack of privacy increases)", Technology Review (Cambridge, Mass.), 104, 7, 59 Sep. 2001.

Antelman, Leonard, "Mixed-signal ICs getting hotter", Electronic Buyers' News, 1992, n 796, PE 20.

Article entitled "Crist praises work of first responders", article from Ocala Star Banner (Feb. 7, 2006).

Article entitled "*Fight Crime Without Wires: Colorado City's Wireless Network Uses GPRS and Wi-Fi to get Information to Public-Safety Workers Faster*", The Gale Group, Information Week, (Feb. 9, 2004).

Atoji et al., "An Information Filtering Method for Emergency Management," *Electrical Engineering in Japan*, 147(1), pp. 60-69 (Apr. 15, 2004) Abstract from Dialog.

Atoji et al., "An Information Filtering Method for Emergency Management", *Transactions of the Institute of Electrical Engineers of Japan, Part C*, 122-C(10) pp. 1846-1855 (Oct. 2002).

Atoji et al., "Information Filtering Method for Emergency Management", *Proceedings 9th IEEE International Workshop on Robot and Human Interactive Communication*. IEEE RO-MAN 2000 (Cat. No. 00TH8499) pp. 96-100 (2000).

Audeh, Malik, "Metropolitan Scale Wi-Fi Networks", IEEE Computer, pp. 119-121 (Dec. 2004).

Baron, David et al., "Radio Data Broadcast System debuts. (News from CES and MacWorld) (Brief Article)" Digital Media, v2, n8, p. 19(1)—Jan. 18, 1993.

Boomer, Rachel "Test Car Has Perks, Lacks Basics," *Halifax Daily News, Weekly Edition*, B7 (Nov. 12, 1997).

Brambert, Dave, "Get board easily? The newest board game: getting market ownership by owning silicon. (Channel News)", LAN Magazine, v8, n13, p. 240(2)—Dec. 1993.

Briefs—Journal: Computerworld, p. 56, Publication Date: Sep. 30, 1996.

Bulk, Frank—Update: "Wireless Lan Battle Plan—We pitted four top products against one another in a second WLAN competition. As in the first contest, Airespace's entry earned our Editor's Choice award", Network Computing, 51 Feb. 17, 2005.

Calem, Robert E., "Battle of the Networking Stars: Part One—ZigBee and Z- Wave wireless technologies fight for the home", Digital Connect Magazine, 2005, n 008, p. 35.

Champaign Security System LLC., "The VideoSNITCH Street Sentinel", (2 pages).

Champaign Security System LLC., VideoSNITCH announcement (1 page, Jun. 28, 2004).

Champaign Security Systems, the VideoSNITCH (2 pages, Feb. 8, 2007).

Chevallay, C., et al., "Self-Organization Protocols for Wireless Sensor Networks," 2002 Conference on Sciences and Systems, Princeton University (Mar. 20-22, 2002).

Cohodas, Marilyn J., "Rescue plan. (Federal Emergency Management Agency) (PC Week Executive) (includes related articles on cost savings, walking away from potential disasters)", PC Week, v12, n21, p. E1(2)—May 29, 1995.

Conner, Margery "Wireless-Sensor Networks: Find a Fit in the Unlicensed Band," EDN, pp. 46-52 (Mar. 16, 2006).

Cox, John , "Switches simplify WLAN deployment", Journal: Network World, p. 1, Publication Date: Apr. 14, 2003.

Cox, John, "Start-up offers high-capacity WLAN gear", Journal: Network World, p. 17, publication Date: Mar. 28, 2005.

Cravotta, Robert, "Charting your course: follow the silicon-breadcrumb trail in this directory to find the perfect device for your project. (The 32nd Annual Microprocessor Directory) (Cover Story)", EDN, 50, 16, 57(11) Aug. 4, 2005.

Curran, Lawrence, "Embedded MCUs/MPUs Weather The Storm—Embedded Processors Are Finding More Diverse Applications, With 32-Bit Devices Building Steam", EBN, 2001, n 1257, p. 55.

Data Sheet entitled "Axis 211/211A Network Cameras-Superior video quality for professional indoor and outdoor applications", AXIS Communications (2006).

Data Sheet entitled "Transforming SCADA as you know it", TERRA Intelligent RTU, Federal Signal Controls, (2006).

Davis, Stan, "What's your emotional bandwidth? (keeping people's attention in the computer age)(Forbes @ 80) (Industry Trend or Event)", Forbes, v159, n14, p. 233(1) Jul. 7, 1997.

Dees, Tim "The Patrol Video Project," *Law & Order*, 52(7), 92 (Jul. 1, 2004).

DeMaria, Michael J., "Home Smart Home", Network Computing, 2002, n 1301, p. 55.

DeMaria, Michael J., "Last Line of Defense—Perimeter Security Is Failing Us. Look To A Host-Based Approach To Protect Your Enterprise From Strikes Against Multiple Fronts", Network Computing, 38 Apr. 29, 2004.

Dodge, John, "Hidden VPN Security Costs Are Worth the Price. (Virtual private networks) (Technology Information)" PC Week, v15, n29, p. N29(1)—Jul. 20, 1998.

Douglas, Merrill, "*Bringing CAD Into the Field*", Mobile Radio Technology, vol. 22, No. 11, p. 36, (Nov. 1, 2004).

Dryden, Patrick, "Kaspia automated network management suite gives an early warning of problems", Journal: Computerworld, p. 61, Publication Date: Sep. 9, 1996.

Eckerson, Wayne, "Revolution in the air Wireless options shaking up the voice system market", Journal: Network World, p. 68, Publication Date: Jun. 15, 1992.

Enriquez, Darryl, "*Wireless System Appeals to Panel: Idea Now Goes to Waukesha Council*", KRTBN Knight-Rider Tribune Business News-The Milwaukee Journal, (Feb. 16, 2006).

Ethan WAN Systems Product page regarding "TS900/TS930 Series", unknown date retrieved from http://www.etherwan.com/products.aspx?categoryID=246 on Oct. 11, 2006.

Feit, Edward, "Computer-linked pager improves security, saves Morton money. (Morton International Inc.)", Communications News, v30, n4, p. 24(1) Apr. 1993.

Full Text Article from Dialog entitled: "Department of Energy Improves Emergency Communications Management With SeNTinel WebEOC From CML Emergency Services Inc."*PR Newswire* , p. 5836 (Aug. 3, 2000).

Full Text Article from Dialog entitled: "Globalstar Develops Wireless Emergency Management Communications System for Disaster Response" *PR Newswire* (Oct. 6, 2005).

Full Text Article from Dialog entitled: "Homeland Security Official Seeks Coherent Wireless Strategy" *Communications Daily* (Dec. 11, 2002).

Full Text Article from Dialog entitled: "National Center for missing & Exploited Children Joins Forces with Nextel, Comlabs, and the Pennsylvania State Police to Develop New Wireless Amber Alert Service" *Business Wire* (Jul. 12, 2004).

Full Text Article from Dialog entitled: "XM Radio and Weather Works to Launch Breakthrough Real-Time Weather Data Service for Aviation, Marine and Emergency Management; Garmin and Heads Up Technologies to Provide State-of-the-Art Receivers" *PR Newswire* (Apr. 7, 2003).

Full Text Article from Dialog entitled: Morrissey, et al., Red Cross to Use Portable LANs to Coordinate Disaster Relief *PC Week*, 5(5), C1 (Feb. 2, 1988).

Full Text Article from Dialog entitled: NexGen City™, Public Safety Wireless Network Provider, Deploys Spectrum® Infinity™; Aprisma Solution Ensures Availability of Data, Voice and Video fro NexGen City's Wireless First Responder Network, *PR Newswire* (Jul. 12, 2004).

Gibbs, Mark, "Bad times are just around the corner Net Results", Journal: Network World, p. 22, Publication Date: Feb. 21, 1994.

Gilsinn, James, D., et al., "Wireless Interfaces for IEEE 1451 Sensor Networks", Slon '01 Sensors for Industry Conference, Rosemont, IL (Nov. 5-7, 2001).

Gralla, Preston, "How Wireless Works", Second Edition, Only Part 4, Chapters 14, 15, 16, 17, 18 and 19, ( © 2006).

Grimes, Brad, "With wireless, it's good to learn from others: agency initiatives offer valuable lessons about technology and security.(technology use by Army)" Government Computer News, 24, 20, 34(1) Jul. 25, 2005.

Hudgins-Bonafield, Christy, et al., "Where There's Smoke . . . ", Network Computing, 1996, n 718, p. 22.

Imel, Kathy J., et al., "Understanding wireless Communicafons in Public Safety", A Guidebook to Technology, Issues, Planning , and Management, First Edition: Mar. 2000; Revised: Aug. 2000; Second Edition: Jan. 2003.

Jacobs, Paula, "How critical is mission-critical? (prioritizing applications and users according to business needs and systems costs) (Enterprise Computing)", HP Professional, v7, n3, p. 36(3)—Mar. 1993.

James, Geoffrey. "The future that never was: seven products that could have changed the industry but didn't", Electronic Business, 31, 12, 46(6) Dec. 2005.

Johnson, Maryfran, "The 12 Beeps of Xmas", Journal: Computerworld, p. 20, Publication Date: Dec. 23, 2002.

Jones, Timothy, "Healthcare Roundup (Buyers Guide)", Teleconnect, 7, 2, 49(1) Feb. 1999.

Knuth, Dean "Wireless LAN Technology in Public Safety," Northrop Grumman Mission Systems (Jun. 2004).

Krochmal, Mo, "You Lead, They Will Follow: Footprints paints a digital map of consumers' trails—New IBM Technology Follows Retail Customers' Footsteps. (Company Business and Marketing)", Computer Reseller News, 69 Feb. 7, 2000.

Lammers, David, "Network-ready home appliances blanket show (intelligent deices linked over networks featured at International Housewares 2000 Tradeshow) (Company Business and Marketing)", Electronic Engineering Times, 24, Jan. 24, 2000.

Latest cabling and wiring products.(News Briefs), Communications News, 37, 6, 44, Jun. 2000.

Lewis, Richard C., "Rhode Island Ready to Launch Statewide Wireless Network" Technology News (Apr. 28, 2006).

Margulius, David L., "IPv6 marches forward—The next-generation Internet Protocol could spark a new generation of embedded and mobile network applications", InfoWorld, 26, 50, 8—Dec. 13, 2004.

Medford, Cassimir, "Changing Fortunes—Vendors Gauge Their Integrator Relationships (Systems/ Network Integration)" Varbusiness, 1993, n 905 , 91.

Miller, Leonard E. "Wireless Technologies and the SAFECOM SoR for Public Safety Communications" *Wireless Communication Technologies Group, Advanced Network Technologies Division, Information Technology Laboratory, National Institute of Standards and Technology*, Gaithersburg, Maryland (2005).

"NICE Systems Launches Three New NiceVision Digital Video and Audio Recording Solutions" NICE Systems Press Release, www.nice.com/news/show_pr.php?id=170 (Apr. 1, 2009).

Paillard, Cedric "Chips square off on Zigbee", Electronic Engineering Times, 2005, n 1365, p. 66.

Patch, Kimberly, et al., "Invasion of the embedded systems", Journal: Network World, p. 1, Publication Date: Jun. 8, 1998.

Product page entitled "AutoFind-Mobile License Plate Recognition (LPR)", AUTO VU Technologies, retrieved from http://www.autovu.com/website/content/products_autofind.html.

Product page entitled "GPS Vehicle Tracking Units: Shadow Tracker™ 2000", retrieved from http://www.onetrackinc.com/Shadow-Tracker-2000.htm on Oct. 10, 2006.

Project MESA: an Update, "Making Progress Toward an International PPDR Standard" pp. 1-7 (Sep. 2003).

Rash, Wayne, Security Adviser: Your security tune-up—It's 2003 and already it's time to review existing policies and perform vital status checks, InfoWorld, 25, 3, 26 Jan. 20, 2003.

Results of Google Search performed.

Rigney, Steve, "The network smoke detector . (Kaspia Automated Network Monitoring System 1.1)(Network Edition First Looks) (Software Review)(Evaluation)" PC Magazine, v16, n7, p. NE19(1) Apr. 8, 1997.

Roff, Graham, IEEE 1451 Overview "A Smart Transducer Interface for Sensors and Actuators" (May 13, 2004).

Rossheim, John, "Handwriting-recognition features can make or break pen computing. (Mobile Computing: PC Week Supplement)", PC Week, v10, n15, p. S15(1)—Apr. 19, 1993.

Schurr, Amy, "Protection from infection; anti-virus software is a necessary safeguard for networked, stand-alone PCs, say corporate buyers. (includes related set of tips for avoiding virus-related problems) (PC Week Netweek)", PC Week, v11, n42, p. N3(1), Oct. 24, 1994.

Siemens Building Technologies "MM 8000: Simple and Secure Danger Management" Siemens Switzerland, Ltd. (Jun. 2005).

Siuru, William, "Police Cars go High-Tech" *Popular Electronics*, 11, 59-62 (Aug. 1994).

Snap shot retrieved from http://www.remingtonelsag.com—Remington ELSAG Law Enforcement Systems, Mobile Plate Hunter.

Storey, Denis "IWCE 2003 Preview" *Mobile Radio Technology*, 21(2) (Feb. 1, 2003).

Success Story: Chicago Police Department, Chicago Police Video Surveillance, Wave, Wireless Corporation, www.wavewireless.com (downloaded Apr. 2006).

SWAP 900, Solar Wireless Access Point, iRDATA Corporation (2006).

SYS Technologies (SYS) Corporate Fact Sheet (Jun. 30, 2006).

Van Dyck, Robert E., "Detection Performance in Self-Organized Wireless Sensor Networks," National Institute of Standards and Technology (Jun.-Jul. 2002).

Van Dyck et al., "Distributed Sensor Processing Over an Ad Hoc Wireless Network: Simulation Framework and Performance Criteria," Wireless Communications Technologies Group; National Institute of Standards and Technology (2001).

Wexler, Joanie M., "Mobile Users Just a Beep Away, Start-Up's Win Beep to Extend Reach of Motorola's Alert Central," *Computerworld*, p. 51 (Feb. 22, 1992).

Wiggins, Roberta, "Myths and Realities of Wi-Fi Mesh Networking" Yankee Group Report, Yankee Group Research, Inc. (Feb. 2006).

Wolff, Robert "Better Communication Through MESH Technology," *Bourbonnais Herald* (Apr. 4, 2006).

Yoshida, Junko, "Buzz surrounds ZigBee as pervasive wireless spec", Electronic Engineering Times, 2001, n 1192, p. 16.

Ziembicki, M., et al., "Hardware random number generator designed for cryptographic systems", Journal: Kwartainik Elektroniki i Telekomunikacji , vol. 49, No. 4, p. 503-14 Publisher: Polish Scientific Publishers PWN, Publication Date: 2003 Country of Publication: Poland.

Zyskowski, John, "Controlling current events: choosing an uninterruptible power supply or line protector. (includes related articles on UPS add-ons, shutdown software and simple network management protocol) (Buyers Guide)", Computer Shopper, V16, N4, p. 302(15)—Apr. 1996.

Power Point Presentation entitled "Arjent S2/Legend Product Introduction" by Paul Gergets present during telephone interview, May 10, 2007, 25 slides.

Federal Signal Corporation Brochure for "Arjent S2 LED Light Bar" bulletin # 3185, version 306, 4 pages, 2006.

Federal Signal Corporation Brochure for "Raydian S2 Light Bar" Bright New Thinking, Preliminary Draft, #m1037, 2 pages, 2007.

Federal Signal Corporation Brochure for "Legend Light Bar" As Brilliant Inside as it is Outside, #3190, 3 pages, 2007.

Federal Signal Corporation Brochure for "Arjent SL Light Bar" bulletin M1005, version 406 (2007).

Federal Signal Corporation Brochure for "Raydian SL Light Bar" bulletin M1035, version 906 (2006).

Photo of Code 3 Lightbar (Model No. LEDX2100).

Photo of Whelen Lightbar (Model No. SX8BBBB LFL Liberty).

Photo of Arjent S2 Federal Signal Lightbar.

Brochure for Code 3 Public Safety Equipment, Inc., "LED X™ 2100 Light Bar," Installation Operation Manual (2002-2006).

Brochure for "Whelen Edge LFL Liberty Linear-LED-Lightbars" Form LIB0506 (2006).

CADVoice® Fire Station Controls: Visual Indicators and Automated Control of Lights, Doors, and More, retrieved from http://locution.com/products/cadvoice_firestation.htm on Jan. 15, 2007.

Highlighted Features and Benefits, Fire Station Alerting: retrieved from http://comtechcom.net.fireestationalerting/model10_fire_station_alert on Jan. 15, 2007.

Fire Station Alerting & Controls, Firefighter Health and Safety, retrieved from http://firestatonalerting.com/index.pjp?module=ContentExpress on Jan. 15, 2007.

Stalling—William, "Data and Computer Communication", Macmilliam Publishing Company, New York, Collier Macmillan Publishers, London total pages 604 Copyright 1995.

* cited by examiner

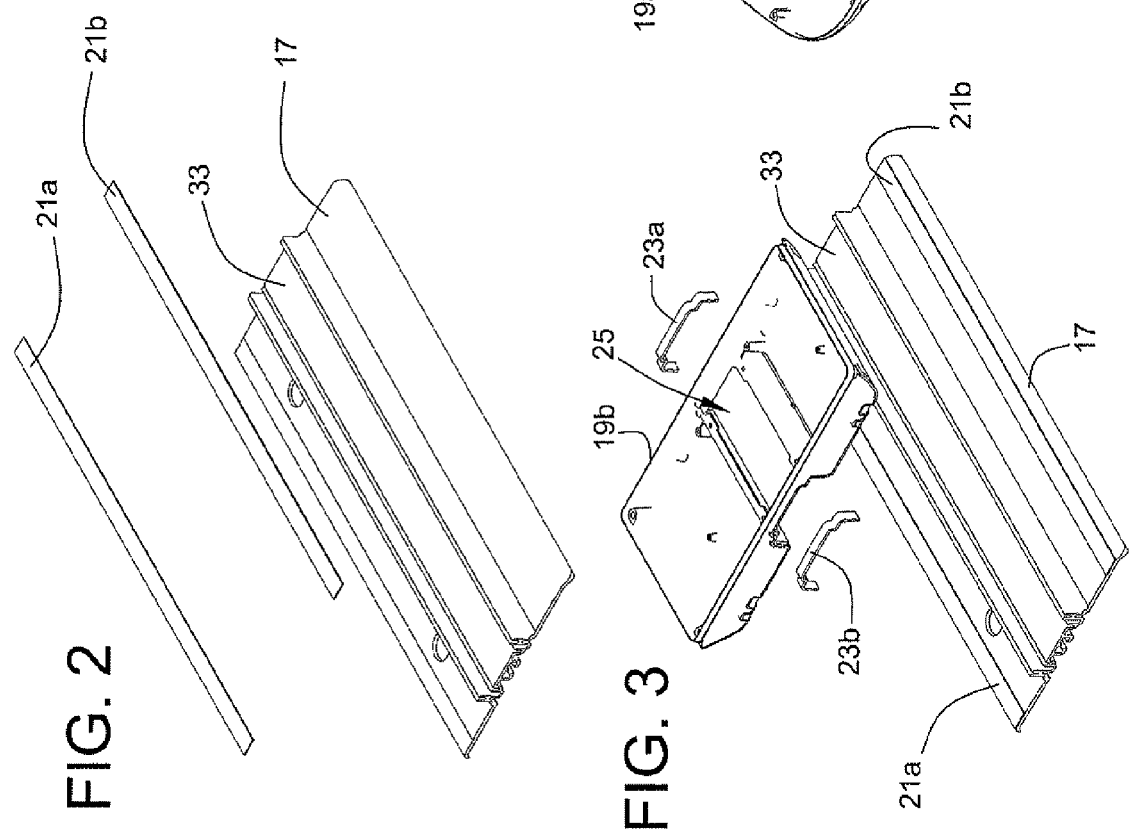

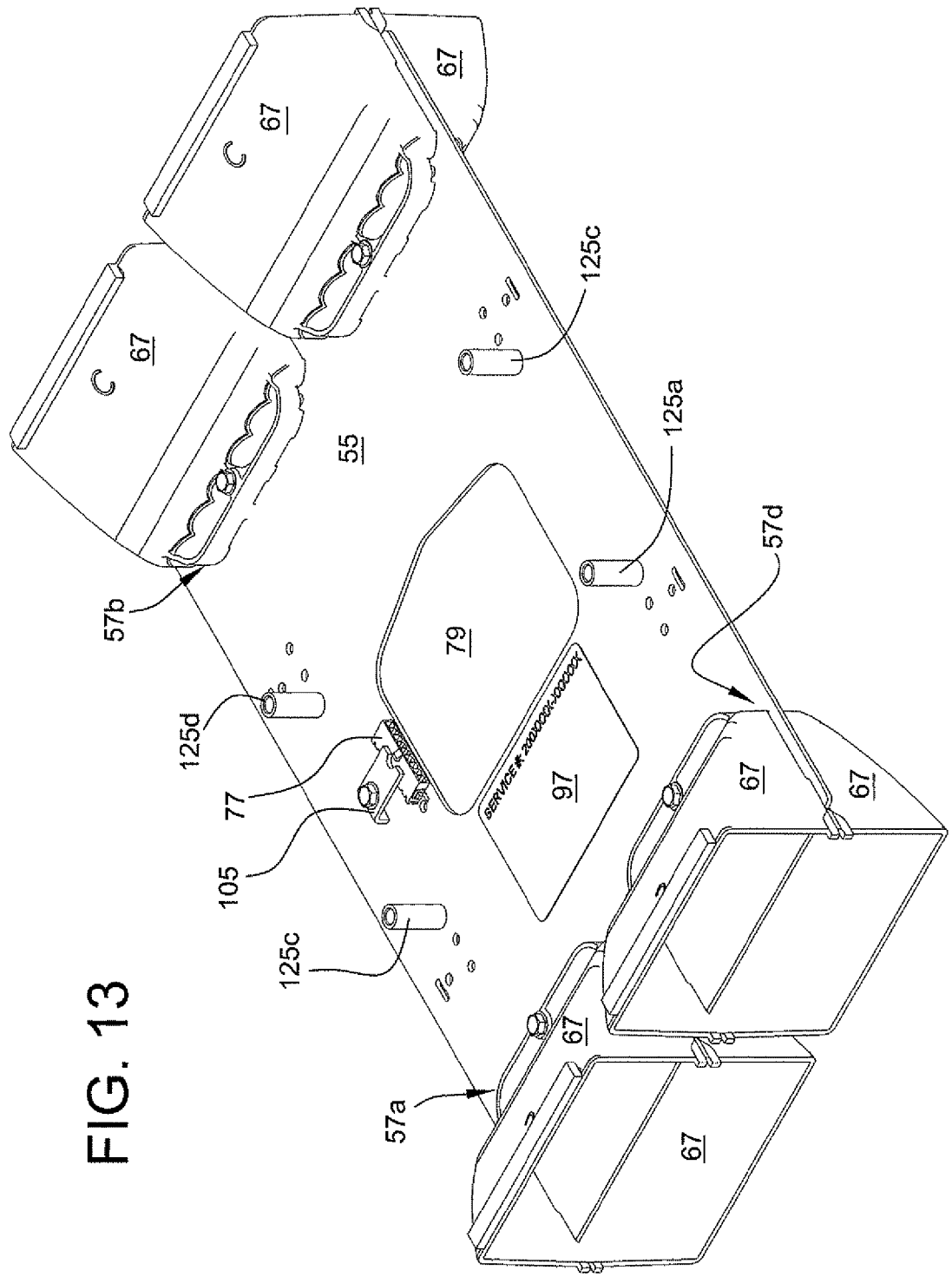

LIGHT BAR AND METHOD FOR MAKING

CROSS-REFERENCE TO RELATED APPLICATIONS

This patent application is a continuation of co-pending U.S. patent application Ser. No. 11/394,752, filed Mar. 31, 2006 now U.S. Pat. No. 7,476,013.

TECHNICAL FIELD

The invention is generally directed to signaling systems for emergency vehicles and, more particularly, to warning light assemblies for mounting to emergency vehicles.

BACKGROUND OF THE INVENTION

A common type of emergency warning system for a vehicle is commonly called a "light bar." Typically light bars are mounted to roofs of vehicles and wired to power sources in the engine compartments and controlled from control heads mounted in the passenger compartments.

Customer demands have driven light bars toward highly customizable designs. Manufacturers of light bars often start with a standard housing and then offer an array of alternative types of lighting devices to populate the interior of the light bar. For example, customers may ask for different mixes of takedown lights and alley lights, whose functions are suggested by their names. Customers may also ask for lights of different colors and different types of light sources such as light emitting diodes (LEDs), halogen lights, strobes or even lasers. Furthermore, the lighting assemblies may be fixed, rotating or oscillating.

To accommodate the demands of customers, the interiors of light bars are typically designed to provide flexibility for substituting different lighting devices as specified by the customer. Often the interior spaces of light bars house an assortment of individual light assemblies and wires to each assembly with associated connectors, making the interiors densely packed with complex wiring schemes.

These designs have evolved into highly complex interiors that are time consuming to assemble and tend to discourage automation of the assembly. Because the manufacturing process remains dependent on manual assembly, there is a higher than desirable risk of errors in the manufacturing process.

In addition to presenting manufacturing challenges, the multiple connections in the wiring schemes of the interior spaces of light bars create points of potential mechanical and electrical failure. Multiple individual wire connectors may fail because of vibration, the stress of temperature cycling, accidental tensioning of the wire during assembly or repair and other common sources of wear and tear. Servicing these many mechanical connections disrupts service and gives rise to reliability issues. Also, service requirements add expense to the light bar.

BRIEF SUMMARY OF THE INVENTION

The light bar of the invention is of a substantially modular construction based on mounting two or more light beam assemblies on a single circuit board. Each board is fabricated with keys that either guide or dictate a precise mounting of the light beam assemblies onto the board. In addition, the circuit boards are keyed to mounting surfaces in the housing of the light bar so that the circuit boards are precisely mounted with respect within the cavity of light bar housing. This dual registration of the light beam assemblies on the circuit boards and the boards in the cavity of the light bar results in a reliable and repeatable registration of the light beam assemblies with the lenses of the light bar housing. Moreover, by providing circuit boards that mount more than one light beam assembly, the invention substantially reduces the amount of loose wiring in the cavity of the light bar housing.

Each circuit board includes areas or stations defined by keys in its surface that assist aligning and attaching two or more light beam assemblies to the board. The keys pilot the light beam assemblies to be mounted at precise locations on the circuit board that register the assemblies in a desired, predetermined position. Each of the light beam assemblies includes keys complementing at least some of the keys in the circuit board such that engagement of the complementing keys registers the assembly at the predetermined position on the board.

The housing for the light bar and the circuit boards each include complementing keys that pilot the mounting of the circuit boards to the interior of the housing such that the circuit boards are mounted in a precise way that registers to the light beam assemblies on the boards to lenses in the housing. Thus, by keying to the light beam assemblies to the boards and the boards to the interior of the light bar housing, the light beam assemblies are automatically optically registered and otherwise properly positioned when the circuit boards are added to the interior of the light bar. The circuit boards include leads that communicate power and control signals from a connector. A cable from the connector on each of the circuit boards electrically connects the light beam assemblies on the board to sources of power and control signals.

In one embodiment, the complementing keys include one or more pairs of mating holes and posts. In another embodiment, the complementing keys include one or more pairs of holes in the circuit board and the light beam assemblies, where each pair of holes aligns to receive a fastener attaching a light beam assembly to the circuit board. Preferably, each key defining a precise position within an area or station on the circuit board for mounting a light beam assembly comprises a pattern of holes and posts or holes in the board that match a complementing pattern of holes and posts or holes in the light beam assembly. The keys can be anything (e.g., markings on the circuit board surface outlining a footprint of the matching light beam device) that helps or guides an assembler precisely mount the light beam assemblies onto the circuit board. In the illustrated embodiment described hereinafter, the keys are holes fabricated in the circuit board to form patterns that match holes and posts formed in the light beam assemblies.

The keys on the circuit board at each area or station for mounting a light beam assembly may be the same for different types of assemblies or each assembly may mate to a unique pattern of the keys. Either way, the keys for each area or station on the circuit board are for alternative types of the one or more light beam assemblies such that the keys pilot and register a selected one of the alternative types of assemblies to the predetermined position on the circuit board for selected type of assembly. In the illustrated embodiment, the keys for each location pilot and register either a light beam assembly for a solid state light source or for a gas-filled tube light source.

Preferably, the circuit board is a thermally conductive circuit board sourced from any of several vendors that communicates control signals to the light beam assemblies, sinks and radiates heat generated by the assemblies and provides mechanical and electrical stability over the environmental conditions to which the light bar is exposed. In the illustrated embodiment of the invention, each of the circuit boards is connected to a controller by a single cable. The controller delivers power and control signals to each of the circuit boards via the single cable connection. In turn, the controller receives power and control signals from a power source and a control head, respectively. The power source may be a battery such as the vehicle's battery or it may be a fuel cell, battery, ultra capacitor (e.g., Maxwell Technologies, San Diego, Calif.) or an array of solar cells. In one embodiment of the invention, the power source is located at the light bar so that power line cables running from the vehicle to the light bar are not required. In this regard, the light bar is made entirely wireless by adding a receiver to the light bar that receives low energy radio frequency (RF) signals from a transmitter associated with the control head.

Many different types of light beam assemblies are suitable for mounting to the circuit boards. For example, the light beam assemblies may be solid state devices such as light emitting diodes (LEDs) or solid state lasers. They may be gas-filled tube such as halogen lamps, strobe lamps, high intensity discharge (HID) lamps, incandescent lamps or light engines. For LED-based light beam assemblies, the LEDs are preferably directly mounted to the circuit board in order to take advantage of the heat sinking capabilities of the circuit board.

All of the light beam assemblies are mounted to the circuit board and each of the circuit boards is preferably positioned in the housing such that its planar surface is oriented substantially horizontally when the light bar is mounted in an operational position. The boards are mounted in a co-planar manner or they may be stacked. Furthermore, the circuit boards may be angled at their ends for either structural support or for properly orienting light sources so their beams are directed into a lens of the light of the light bar without requiring reflectors to orient the beams.

In one embodiment of the invention, each of the circuit boards attaches to the housing of the light bar so that the light beam assemblies are oriented upside down such that, when the bar is viewed from above, the backplanes of the circuit boards are visible and effectively shield an interior space of the housing, which includes the light beam assemblies.

In keeping with another aspect of the invention, the modular construction of the light bar makes its assembly easy, quick and error resistant. First, the circuit boards are fabricated in accordance with the types of light beam assemblies to be added. For example, if the light beam assemblies are solid state devices, the fabrication process preferably includes adding the LEDs or other solid state device to the circuit board as part of the fabrication process. With the fabricated boards as a starting point, they are each then populated with two or more light sources in accordance with a customer's requirements (e.g., color, flashing, rotating). Because each of the boards includes keys to register the light beam assemblies into a proper position, they are reliably fastened to the circuit boards at the right locations. Then each of the circuit boards is fastened into the housing of the light bar. As the boards are placed into the housing, they are registered to the housing with respect to one or more references, which aligns each of the light sources on the circuit board with a lens in the housing.

Populating the circuit boards with light beam assemblies includes selecting a type of light beam assembly for each station or area of the circuit board in keeping with a customer request. When the boards are fastened to the housing of the light bar to register the light beam assemblies with the lenses of the housing, a single cable is connected between the circuit board and the controller in order to deliver power and control signals to the light beam assemblies.

While the invention will be described in some detail with reference to preferred and alternative embodiments, these embodiments are intended to be illustrative and limiting the invention to such detail. On the contrary, the claimed invention is intended to cover all alternatives, modifications and equivalents of the illustrated embodiments that fall within the spirit and scope of the invention as defined by the claims.

BRIEF DESCRIPTION OF THE SEVERAL VIEWS OF THE DRAWINGS

FIGS. 2 through 9 illustrate assembly of the light bar shown in FIG. 1 as follows:

FIG. 2 illustrates an aluminum extrusion that provides a structural basis for the light bar;

FIG. 3 illustrates joining to the extrusion of FIG. 2 a center section of a lower portion of a housing for the light bar;

FIG. 4 illustrates joining to the extrusion end sections of the lower portion of the light bar housing that mate with the center section;

FIG. 5 illustrates the lower portion of the light bar housing fully assembled on the aluminum extrusion, including an electronic controller;

FIG. 6 illustrates populating one of five circuit boards in the light bar with light beam assemblies in keeping with one embodiment of the invention;

FIG. 7 illustrates populating the five circuit boards into the assembled lower portion of the light bar housing of FIG. 5 in keeping with one embodiment of the invention;

FIG. 8 illustrates joining an upper portion of the housing to the assembled lower portion in order to complete the assembly of the light bar;

FIG. 9 is a schematic diagram illustrating the electrical connections between the controller and the circuit boards in FIG. 8;

FIG. 13 illustrates still another alternative embodiment in which the circuit board of FIG. 7 is populated with light beam assemblies on both it top and bottom sides.

DETAILED DESCRIPTION OF THE INVENTION

Figure 1:
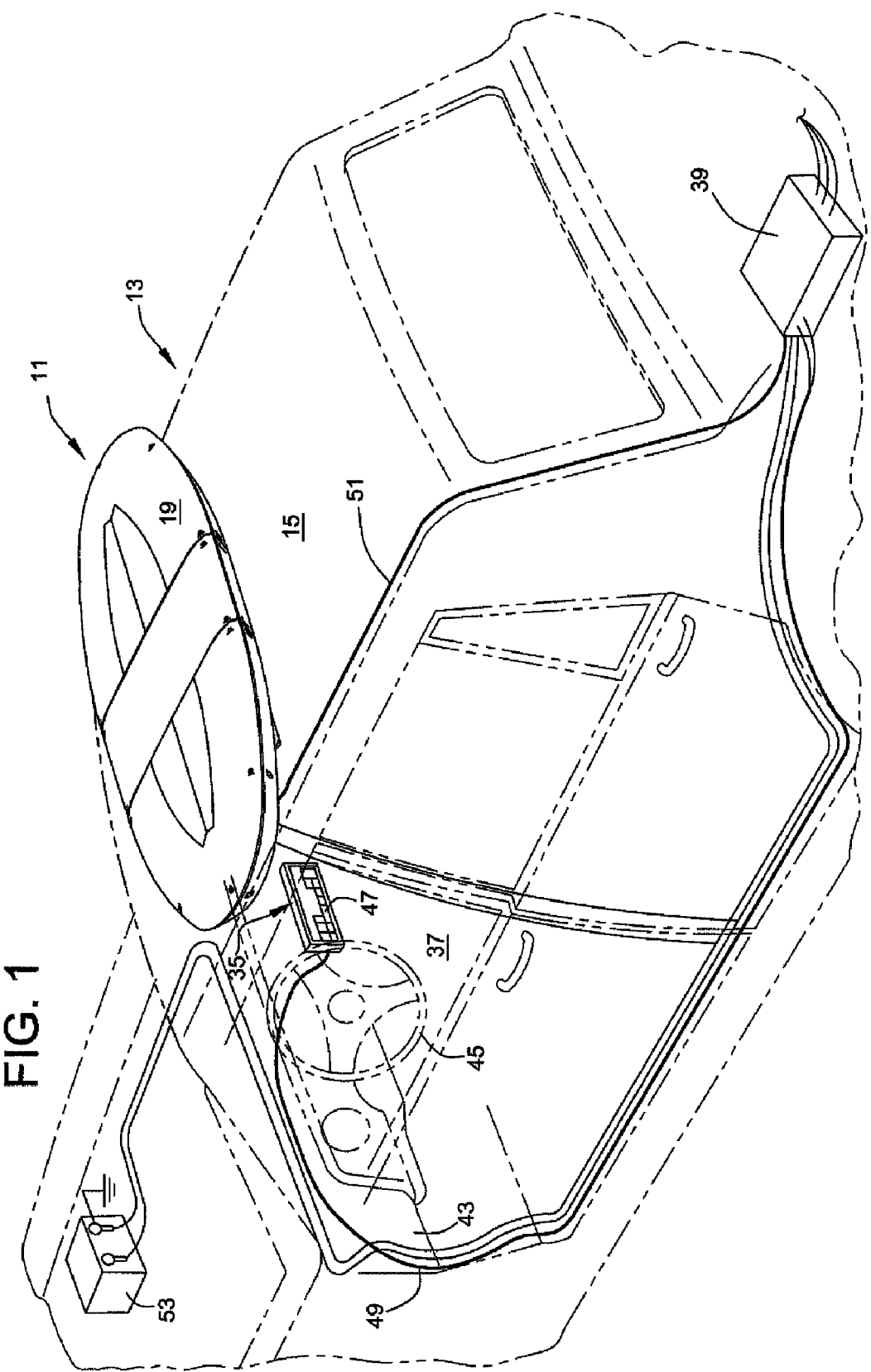
FIG. 1 illustrates an emergency vehicle equipped with a light bar incorporating the invention.

Turning to the drawings and referring first to FIG. 1, an emergency signaling system 11 according to a preferred embodiment of the invention is installed in an exemplary emergency vehicle 13 shown in broken lines. The system 11 includes a plurality of light beam assemblies or signaling devices best shown in FIGS. 6 and 7. The emergency signaling system 11 is mounted to a roof 15 of the vehicle 13.

Emergency signaling systems of the type mounted to the roofs of emergency vehicles are commonly called "light bars" because they are typically shaped as a bar traversing the vehicle's roof. In keeping with this convention, the illustrated emergency signaling system 11 is hereinafter referred to as a "light bar" since it is primarily intended for mounting to the roofs of emergency vehicles such as the roof 15 of the illustrated vehicle 13. However, those skilled in the art will appreciate that the manufacturing technique described hereinafter for the illustrated light bar is applicable to other types of lighting systems such as traffic directional indicators.

Figure 5:
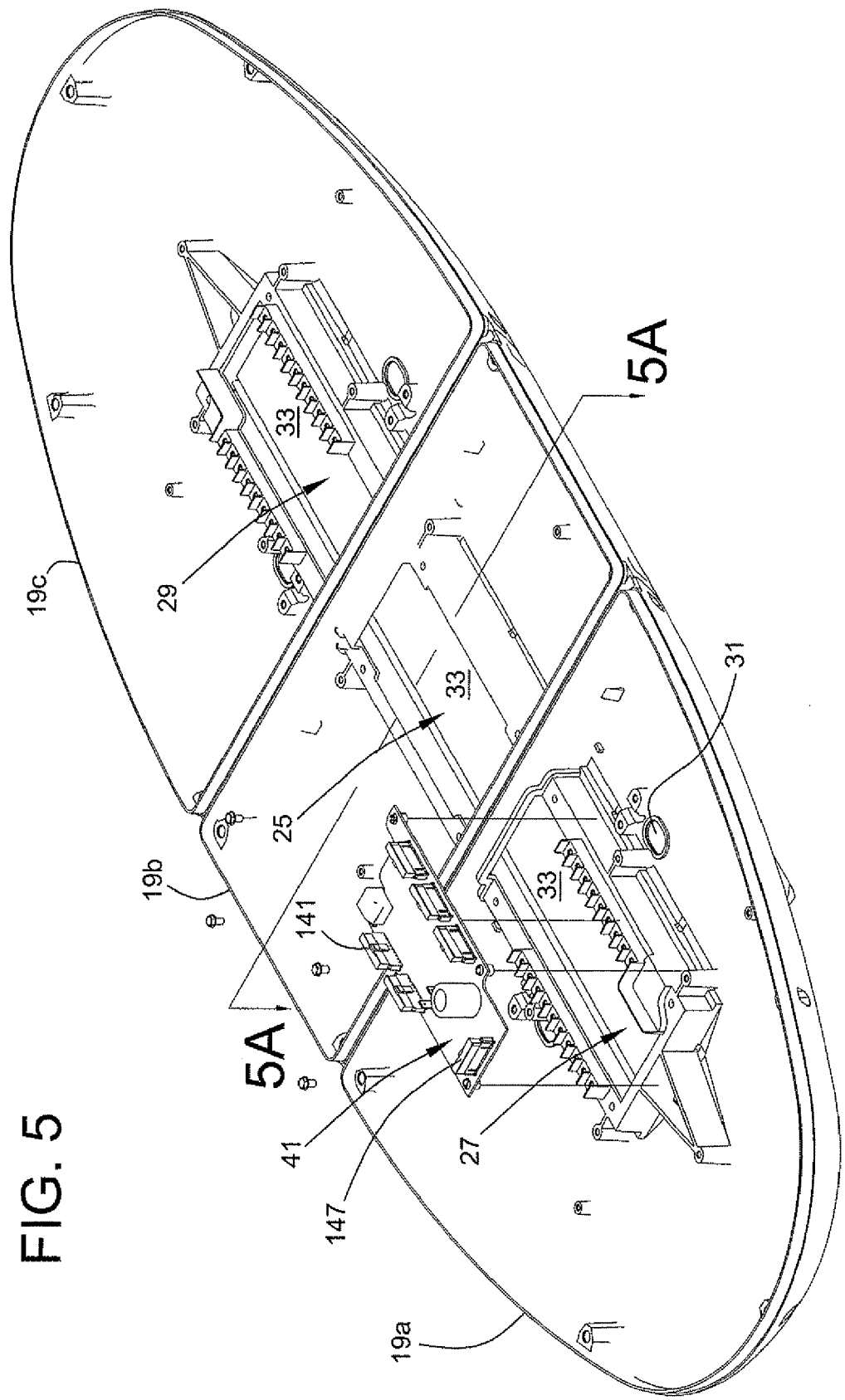
Figure 8:
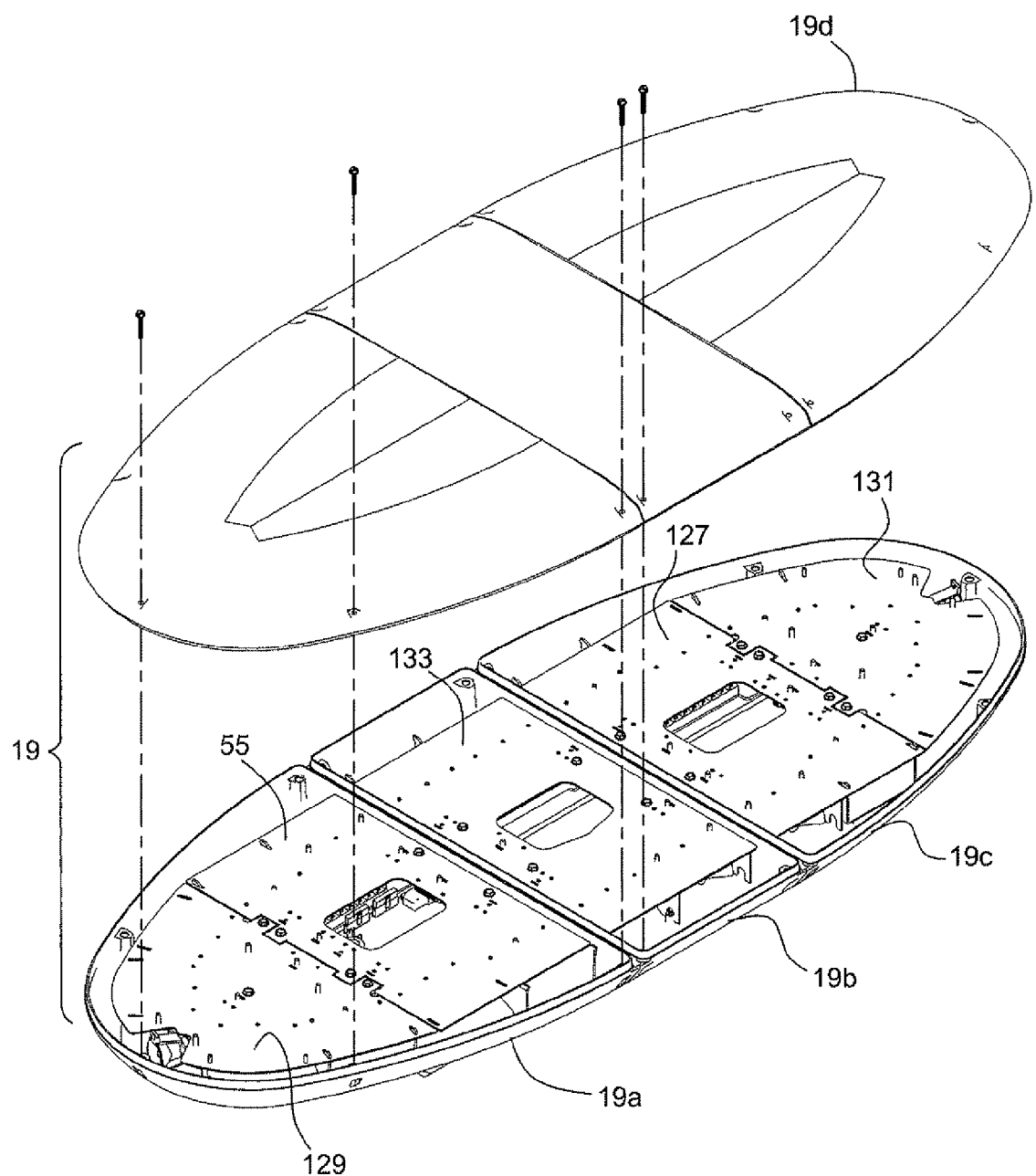

As best shown in FIGS. 2-4, the light bar 11 includes a frame 17 formed from an aluminum extrusion supporting a housing 19 (FIGS. 1 and 8) containing light beam assemblies and a portion of the circuitry for controlling the assemblies as will be explained more fully hereinafter. The housing 19 forms a protective shell for the light beam assemblies and is mounted to the frame 17 as best shown in FIGS. 2-4. The housing 19 comprises three bottom sections 19a, 19b and 19c as best illustrated in FIGS. 3-5, forming a bottom shell. The bottom shell mates with a top shell 19d (FIG. 8) as best shown in FIGS. 1 and 8 to substantially seal the interior space of the housing 19. However, access holes are in the bottom shell for allowing cable to be threaded into the interior space and to allow of ventilation of the space. The top and bottom shells of the housing 19 include gaskets (not shown) to help seal the interior of the light bar 11 from the external environment. In this illustrated embodiment, the seals and gaskets are like those in the Arjent™. The top and bottom shells of the housing 19 include gaskets (not shown) to help seal the interior of the light bar 11 from the external environment. In this illustrated embodiment, the seals and gaskets are like those in the Arjent™ light bar. The top and bottom shells are made of a transparent material such as a polycarbonate plastic, which is a conventional material often used for emergency lighting devices such as light bars.

The external portions of the light bar 11 are illustrated as being substantially the same as a Federal Signal Arjent™ light bar. For example, the light bar 11 mounts to the vehicle 13 by way of a mounting assembly at each end of the frame, which is not illustrated, but is substantially the same as Federal Signal's Arjent™ light bar. Also, well known techniques for electrically and physically sealing the housing 19 are employed and, for the illustrated light bar 11, they are the same as that of the Arjent™ light bar. For example, FIG. 2 illustrates two linear strips 21a and 21b of cushioning material that interface the frame 17 to the sections 19a, 19b and 19c of the bottom shell of the housing 19. Gaskets such as the gaskets 23a and 23b in FIG. 3 provide an effective water seal for the opening 25 in the center of the housing section 19b. Similar seals (not shown) mate with the end sections 19a and 19c to seal the openings 27 and 29, respectively, in these sections of the housing 19.

With all three of the lower sections 19a, 19b and 19c in place on the frame 17 as shown in FIG. 5, the gaskets cooperate with the frame 17 to completely seal the lower shell of the housing 19. However, air holes, such as a hole 31 in FIG. 5, are typically formed in one or more sections of the housing to allow for circulation of air. In general, however, the gaskets seal the interior of the lower shell of the housing 19 from water and other ambient conditions of the external environment that might otherwise interfere with the operation for electronics in the light bar 1.

Although the illustrated embodiment is based on an Arjent™ light bar, many different light bar housings are amenable to being fitted with the invention. Staying with Federal Signal's product line as an example, light bars such as the Raydian™, Jet™, Aerodynic™, Streethawk™ and Vista™ may also benefit from the invention as well as light bar designs not yet commercialized.

Figure 5A:
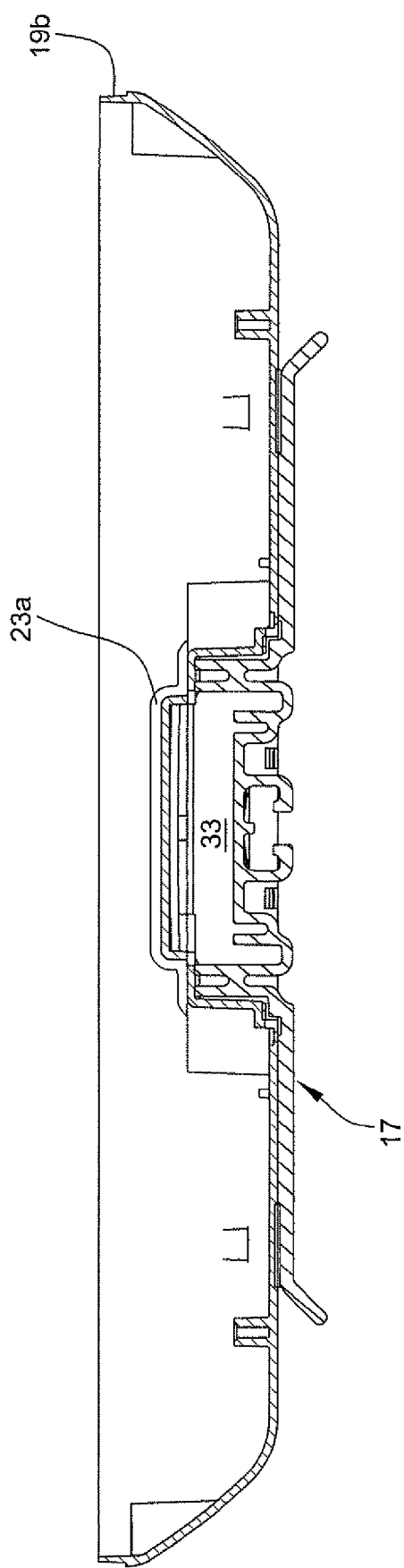
FIG. 5a is a sectional view of the assembled lower portion of the light bar taken along the line 5a-5a in FIG. 5.

In keeping with an Arjent™ light bar, the frame 17 is preferably formed by a conventional extrusion process to define a channel 33, best seen in FIG. 5a, for communicating wiring emanating from one of the housing sections 19a, 19b and 19c to other sections. After the housing 19 is secured to the frame 17, the channel 33 is environmentally isolated so that wiring in the channel is protected from ambient conditions.

In order to form the housing 19 and secure it to the frame 17, the bottom shell of the housing 19 comprising sections 19a, 19b and 19c is secured to the frame 17 by threaded screws or other types of fasteners (not shown) received by pre-drilled pilot holes in the frame. Circuit board assemblies are mounted in the bottom sections 19a, 19b and 19c as explained in detail hereinafter. In this regard, any type of light radiating device (e.g., a LED, halogen, strobe) may be used as the lighting assemblies of the invention. As explained hereinafter in greater detail, an attribute of the light beam assemblies or light sources in keeping with the invention is their ability to be mounted directly to a circuit board.

Referring to FIG. 1, a control head 35 in a passenger compartment 37 of the vehicle 13 controls the light beam assemblies in the light bar 11. The control head 35 is connected to first and second control units 39 and 41, respectively, in order to communicate control signals to the light beam assemblies in the light bar 11. The control unit 39 in the illustrated embodiment provides control functions for other emergency signaling apparatus associated with the vehicle 13. For example the control unit 39 may also serve a siren. In vehicles without other emergency signaling apparatus, however, the control unit 39 may be eliminated and the wiring to the light bar may be directly from the control head 35. The operator of the vehicle 13 preferably mounts the control head 35 to the dashboard/instrument panel area 43 of the vehicle just to the right of the steering wheel 45 for easy access. Although the first control unit 39 is shown as mounted in the trunk area of the vehicle 13, it may be mounted elsewhere within the vehicle, depending upon the precise design of the vehicle and the number of other accessories included in the vehicle. For example, control unit 39 may be mounted under the dashboard area 43. The second control unit 41 (shown in FIG. 5) is mounted within the housing 19 of the light bar 11.

Keystrokes to a keypad 47 incorporated into the control head 35 generate control signals and the control head provides them to the control unit 39 by way of a cable 49, which in turn communicates signals to the control unit 41 within the light bar 11 by way of cable 51. A control system such as Federal Signal's Smart Siren™ system is a suitable example of the illustrated control system.

From the control unit 41 in the light bar 11, the operation of the light beam assemblies is directly controlled in accordance with signals generated at the control head 35. Installers of the light bar 11 typically strategically place cables 49 and 51 within the interior of the vehicle 13 so they are the least conspicuous and require the least modification of the standard interior features. In this regard, a serial connection between the control head 35 and the control unit 39 effectively minimizes the number of wires comprising the cables 49 and 51. Each of the two cables 49 and 51 includes two data-carrying wires for bi-directional serial communications. Separate cabling from a battery 53 carries power and reference ground wires to the control units 39 and 41, which in turn deliver the power the light assemblies on the circuit boards. In an alternative embodiment illustrated in FIG. 12, the control signals are electromagnetic signals that propagate through the air so that the cables are not needed for controlling the light bar 11. In a further alternative embodiment also illustrated in FIG. 12, the cables 49 and 51 are entirely eliminated by providing one or more power sources in and/or on the light bar 11. These alternative embodiments will be more completely described in connection with the description of FIG. 12 hereinafter.

Keystrokes to keys on the keypad 47 of the control head 35 initiate operating modes of the light bar 11 that provide different visual or warning patterns. Each of the warning patterns creates an effect that provides a particular degree of warning suitable for one or more specific situations.

In addition to comprising different types of light sources such as LEDs and halogen lights, the light beam assemblies may also be of different types of functionality. For example, some of the light beam assemblies may provide warning functions while others provide non-warning functions such as flooding specific areas with light. For example, the light assemblies may include lighting of steady illumination in single directions, which is commonly labeled a "take down" function. Other lights may serve to illuminate toward the sides of the vehicle 13 and are referred to as "alley lights." All of these different types of light sources and functionality may be among those populating the light bar 13 and activated for operation through the control head 35. Furthermore, the light beam assemblies may include assembles that rotate or oscillate.

In accordance with one important aspect of the invention, two or more of the light beam assemblies of the light bar 11 are mounted to a common circuit board that fits into the interior space of the light bar in a predetermined way such that the light beam assemblies are in registration with lenses for the light beams generated by the assemblies. Each circuit board is configured to include keys for registering the fastening of the light beam assemblies to the board at a precise location. In turn, each of the circuit boards includes keys for automatically registering or correctly aligning the positioning of the board in the interior space of the light bar. Thus, during the assembly of the light bar, mating the complementary keys in the light assemblies and circuit board causes the light assemblies to be automatically fastened to the board at predetermined desired positions. Each of the circuit boards has two or more areas defined by the keys for mounting light beam assemblies.

Each of the several areas or stations for mounting a light beam assembly on the circuit board may include several alternative patterns of keys, with each pattern matching to one type of light beam assembly. Alternatively, the pattern of the keys at each area or station for mounting a light beam assembly is the same for all types of assemblies. The illustrated embodiment of the invention described in detail hereinafter employs this latter approach. Either way, the pattern of the keys ensures that the light beam assemblies are precisely positioned on the circuit board so that when the board is fastened to the housing of the light bar, the light beam assemblies are in an approximate exact position intended for best broadcasting the light as part of the light bar functionality.

At each area or station of a circuit board for mounting a light beam assembly, the pattern of the keys ensure any type of assembly (e.g., light emitting diode (LED) or halogen light beam assemblies) are mounted at the desired location for each type. The precise location for an LED-based light beam assembly may be different than that of a halogen light beam assembly. If the two different types of assemblies rely on the same pattern of keys for alignment on the board, then the assemblies themselves are configured to ensure the assemblies are positioned properly assume the shared pattern of keys. By providing a pattern of keys, the assembly process maintains the automatic alignment of the light beam assemblies while at the same time allow for customization of the light bar. For example, for a circuit board that has two areas or stations of keys and two types of assemblies that can be mated to the pattern(s) at the are/station, the board can be configured four different ways as shown in the table below.

|   | Light Beam Assembly in First Area | Light Beam Assembly in Second Area |
|---|---|---|
| 1 | first type | first type |
| 2 | first type | second type |
| 3 | second type | second type |
| 4 | second type | first type |

The light beam assemblies are fastened to the circuit board with any type of conventional fasteners. In the illustrated embodiment, the fasteners are screws, but they may be other types of fasteners such as snap-on fasteners. The fasteners may also function as the keys for properly registering the light beam assemblies to the circuit board. For example, a pattern of pilot holes in the circuit board complements a pattern of pilot holes in one type of the light beam assemblies such that the holes of the two patterns align in a vertical registration when the light beam assembly is properly positioned on the circuit board. Then the aligned pilot holes receive fasteners to secure or fasten the light beam assembly in a predetermined position on the board that thereby automatically registers the light beam assembly into proper alignment with a lens in the housing 19 of the light bar 11 when the circuit board is mounted to the interior of the light bar. Instead of the keys for automatically aligning the light beam assemblies to the circuit board being patterns of aligned pilot holes for fasteners, the keys may be patterns of complementary posts and pilot holes and one or more mating and aligned pilot holes that receive fasteners to secure the assembly to the circuit board. From the forgoing, those skilled in the art will appreciate there are many other types of keys for precisely aligning the light beam assemblies on the circuit board that may either also function as fasteners or cooperate with fasteners to secure the light beam assemblies in the precise position on the circuit board defined by the registration of the keys.

Once the circuit boards have been populated with light beam assemblies of the appropriate type, they are each fastened to the interior of the light bar 11. In keeping with the invention, the circuit boards are keyed to the interior space of the housing 19 such that each of the boards fits in a predetermined position within the housing. The predetermined position aligns the light beam assembly with lens in the housing 19 for receiving light beams generated by the assemblies.

Preferably, the circuit board is of a composition that maintains its structural and electrical integrity over the ambient conditions of the light bar 11. In this regard, the light bar 11 is directly exposed to weather conditions in the area it is placed in service, which can include both hot and cold weather extremes. If the circuit board cannot tolerate these conditions, significant warping of its otherwise relatively large planar surface may cause electrical connections to fail and misdirection of the light beams. Also, some of the types of the light beam assemblies have attributes that may impose additional requirements on the circuit board. For example, some light beam assemblies produce significant amounts of heat, making the heat sinking capacity of the circuit board an important characteristic. In addition, the printed circuit board is a structural component in the light bar assembly in that it provides a platform for supporting the light beam assemblies.

Given the foregoing considerations and requirements, suitable circuit boards for the invention presently available include but are not limited to the following: Fiberglass, phenolic, aluminum (e.g., Berquist boards), steel and ceramic printed circuit board materials. Regardless of the specific composition, the boards need to be structurally robust to environmental conditions that include temperature cycling over an expected wide range that the light bar will be exposed to wherever it is operating. Some specific examples of aluminum products and sources of suitable boards are ELPOR™ by ECA Electronics of Leavenworth, Kans. and Anotherm™ of TT Electronics PLC of Clive House 12-18, Queens Road, Weybridge Surrey KT13 9XB, England. Moreover, conventional fiberglass-based circuit boards may also provide a basic build block for a suitable board. Multi-layered fiberglass boards by M-Wave™ of Bensenville, Ill. can provide the necessary structural strength and they can by fabricated to have the desired thermal properties by incorporating large ground and power planes into the board and multiple "pass throughs" or "vias." Turning to FIG. 6, an exemplary embodiment of a circuit board 55 in keeping with the invention includes four areas or stations 57a, 57b, 57c and 57d for fastening light beam assemblies to the board. Each of the areas 57a-57d includes keys for aligning one of the two types of light beam assemblies 59 and 61 illustrated in FIG. 6. The pattern of keys at each of the areas 57a-57d in the illustrated embodiment includes three pilot holes 63a, 63b and 63c in the circuit board 55. In the illustrated embodiment, the pattern of the keys is the same for both types of light beam assemblies 67 and 85.

Figure 6:
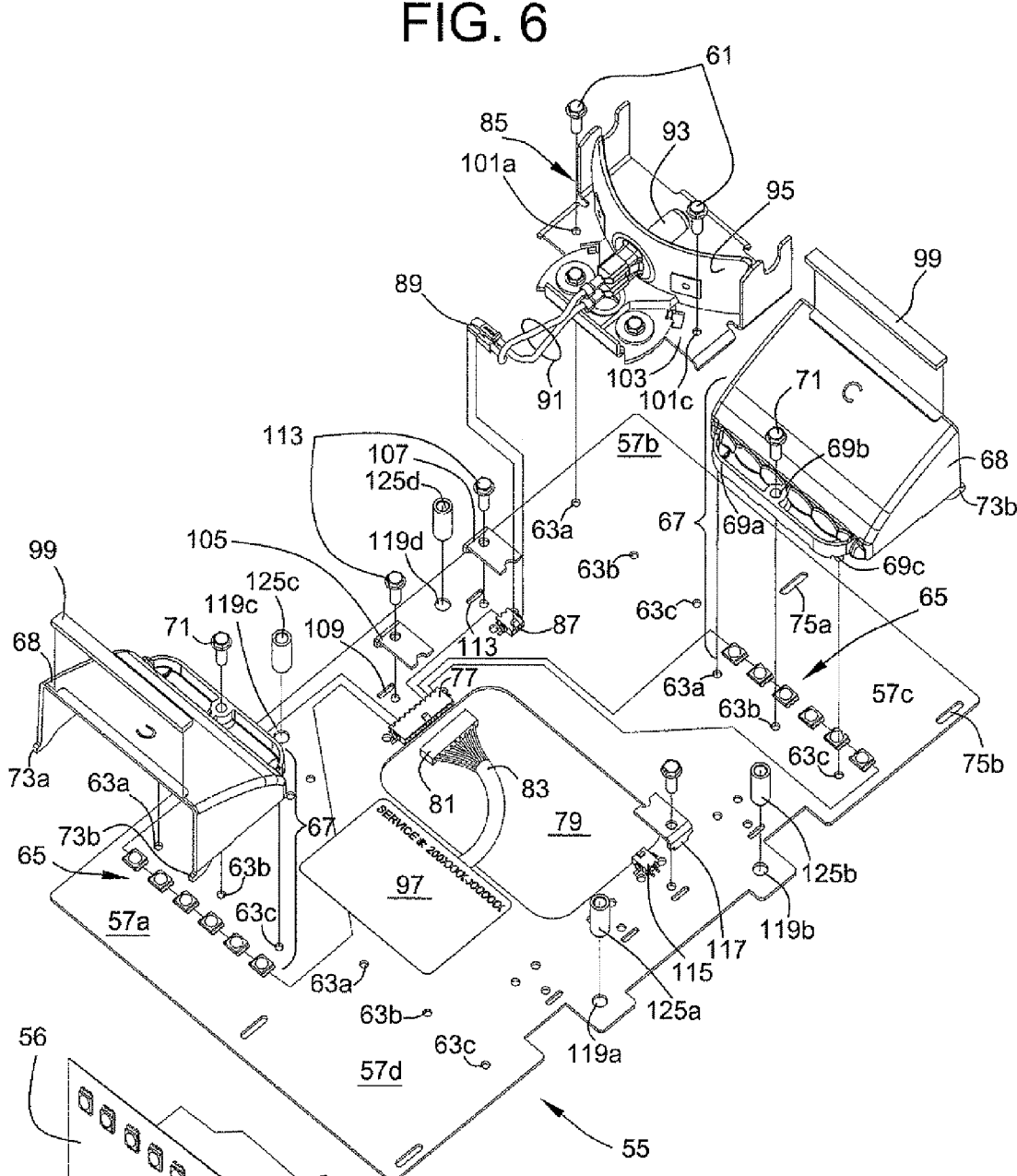

The circuit board illustrated in FIG. 6 includes two of the light beam assemblies 67 and one of the assemblies 85. The following description refers to just one of the assemblies 67 since they are identical. Those readers skilled in the art will appreciate that the description applies to both light assemblies 67 and, more generally, as many light assemblies 67 that may populate the circuit board.

The light beam assembly 67 includes six light emitting diodes (LEDs) collective identified as number 65 in FIG. 6 and a reflector 68. The reflector 68 of the light assembly 67 redirects light from a vertically traveling beam emanating from the LEDs to a horizontally traveling beam. The LEDs 65 are laid down on the circuit board as part of the board's fabrication process. In this regard, the circuit board includes conductive paths leading from a connector 77 mounted along an edge of an opening 79 in the board 55. As discussed in further detail hereinafter, the connector 77 mates with a connector 81 of a cable 83 that has an opposing end connected to the control board 41. The cable 83 carries power and control signals to the board 55. Electrical lead lines in the circuit board carry power and control signals to the electronic components (e.g., drivers) and LEDs 65 and to all other types of light beam assemblies on the circuit board.

In the illustrated embodiment, the second type of light beam assembly 85 is a halogen light beam assembly. Lead lines on the circuit board from the connector 77 carry power and control signals to a connector 87. The connector 87 is configured to mate with the connector 89 that provides the ends of wiring 91 to the halogen light beam assembly 85. The halogen light beam assembly comprises a halogen bulb 93 and a reflector 95. The heat sinking properties of the circuit board 55 serve to cool the environment surrounding the halogen light, which includes the LEDs 65 in the upper right hand part of the circuit board. By managing the thermal conditions surrounding the halogen light 93, the LEDs are maintained at a thermal condition that allows them to operate efficiently. Exposure to high heat would otherwise cause the performance of the LEDs to deteriorate.

Both types of light beam assemblies in FIG. 6 are associated with keys for precisely positioning the light beam assemblies on the circuit board 55. The keys in the circuit board 55 comprise a pattern of pilot holes for each area or station of the board for receiving a light beam assembly. The pattern of pilot holes is the same for all types of light beam assemblies, but that need not be true as previously mentioned. Each light beam assembly could mate to a different pattern of keys in an area. In the illustrated embodiment, three holes at each area of the board 55 for receiving a light beam assembly register an assembly to a precise position on the board. Because the circuit board 55 is substantially rectangular and fits into the housing 19 at an area where the housing is curved, the two patterns of keys on each of the two opposing ends of the board 55 are offset from one another by a distance that accommodates the curvature of the housing 19. In this manner, the light beam assemblies are maintained at a desired proximate position with respect to the interior surface of the housing 19 despite mismatch between the curved interior surface of the housing 19 and the rectangular shape of the circuit board 55.

The reflector 68 includes a pattern of keys that complements the pattern of the pilot holes 63a, 63b and 63c in the circuit board 55. Mating the keys of the reflector 68 to the pilot holes 63a, 63b and 63c in the circuit board 55 automatically aligns or registers the location of the reflector at a location for properly reflecting and redirecting the light from the LEDs 65.

In the illustrated embodiment, the keys in the reflector 68 comprise two posts and a pilot hole as best seen in the reflector in the upper right of the circuit board 55. The pilot hole 69b aligns with pilot hole 63b in the circuit board 55 and receives a fastener in the form of a screw 71 to fasten the reflector to the board. Posts 69a and 69c (the former is partially obscured in the illustration of the reflector 68 in the upper right of FIG. 6) mate with pilot holes 63a and 63c, respectively, of the circuit board 55. To further assist in the correct alignment of the reflector 68 on the circuit board 55 and to provide additional structural integrity, the reflector 68 includes tabs 73a and 73b at the lower extents of the reflector's sides, which are best seen in the reflector in the lower left of circuit board 55 in FIG. 6. The tabs 73a and 73b of the reflector 68 in the upper right corner of the circuit board 55 mate with complementary slots 75a and 75b, respectively, in the circuit board. However, because the reflector 68 in the lower left of the circuit board 55 in FIG. 6 is set forward on the board to accommodate the curvature of the housing 19, the forward ends of that reflector's sides including the tabs 73a and 73b extend beyond the circuit board. Therefore, there are no slots in the circuit board for receiving the tabs of this reflector.

In the illustrated embodiment of the invention, the halogen light beam assembly 85 in FIG. 6 incorporates a pattern of keys substantially the same as those of the reflector 68 for the LED light beam assembly 67. Therefore, the circuit board 55 has a complementary pattern of keys for the halogen light beam assembly that is substantially the same for both types of light beam assemblies 67 and 85. However, because of the configuration of the halogen light beam assembly 85, the middle of the three pilot holes in the pattern is not used for registering the assembly into its proper position on the circuit board 55. Specifically, the pilot holes 101a and 101c in the base plate 103 of the halogen light beam assembly 85 align with the pilot holes 63a and 63c, respectively, in the circuit board 55 as illustrated. Screws 61 serve as fasteners to secure the halogen light beam assembly 85 to the circuit board 55 at the precise position defined by the registration of the pilot holes 101a and 101b with the pilot holes 63a and 63c, respectively.

Moreover, the halogen light beam assembly 85 is illustrated as a stationary light, but those skilled in the art will appreciate that the assembly may also be an oscillating assembly. Furthermore, additional types of lights other than LED and halogen based assemblies are appropriate for mounting to the circuit board in a keyed fashion in keeping with the invention. For example, strobe light assemblies may be mounted to the circuit board if properly keyed for precise and automatic registration.

Although the circuit board 55 in FIG. 6 includes four areas or stations 57a, 57b, 57c and 57d for each receiving a type of light beam assembly, only three of the four areas are shown as being populated. In this regard, the template-like design of the circuit board 55 allows for customized population of the light beam assemblies onto the board 55 while the keys at each position assure that the assemblies are properly positioned. As a further aid in the assembly or manufacturing process, a label such as the label 97 in FIG. 6 includes custom configuration instructions for the board 55. For example, during the process of assembling the light bar 11, a factory worker reads the instructions on the label 97, which provides information describing the type and details (e.g., color) of the light beam assemblies for each of the areas or stations 57a, 57b, 57c and 57d of the board. The board comes to the factory worker with the LEDs 65 already mounted to the board since in the illustrated embodiment they have been added to the board during the board's fabrication process. However, those skilled in the art will appreciate that the LEDs 65 can be added as part of the assembly process in appropriate circumstances. In any event, the design of the circuit board allows at once full flexibility to customize the lights and colors of the light bar 11 while assuring that the assembly process proceeds quickly and reliably because of the keys that automatically cause the light beam assemblies to be secured by the factory worker to the areas 57a, 57b, 57c and 57d such that they are in proper registration when the board is secured to the housing 19. Wiring from each of the light beam assemblies is either already laid down as part of the printed circuit board (e.g., the LED-based light assembly) or a connector is fabricated into the board to transition a cable of the assembly to lead lines on the circuit board (e.g., the halogen lamp light beam assemblies).

A cushion strip 99 protects the top of the reflector 68 from being damaged by repeated contact with the interior surface of the housing 19. In the illustrated embodiment, the top of the reflector 68 is physically very close to the interior surface of the housing 19 when the circuit board 55 is mounted to the housing. The cushion strip 99 helps ensure movement from vibration resulting in the top of the reflecting touching the surface of the interior surface of the housing does not result in damage to the reflector. In order to provide mechanical stress relief for the connectors 77 and 87, support brackets 105 and 107 are keyed to slots 109 and 111, respectively, and fastened to the circuit board 55 by screws 113. A flange area of the brackets 105 and 107 cover the tops of the connectors 77 and 87, respectively, to support the connectors when they are torqued by coupling and decoupling the mating connectors 91 and 89, respectively. Although there is only one halogen light beam assembly 85 in the illustrated embodiment of the circuit board 55 in FIG. 6, the board is configured for supporting two types of assemblies and, therefore, since the area 57d is not configured for an LED light beam assembly 67, a connector 115 of the same type as connector 87 is mounted to the circuit board to support the addition of a halogen light beam assembly at area 57d if required. Like connector 87, connector 115 is associated with a bracket 117 that provides stress relief. The bracket 117 is fastened to the circuit board 55 by a screw 119, but it could be any type of fastener.

The circuit board 55 is preferably installed into the light bar housing 19 upside down with respect to its orientation illustrated in FIG. 6. This orientation of the circuit board enables the light beam assemblies 67 and 85 to be properly aligned with lenses in the lower shell of the housing 19. The lenses in the housing may be distinct from the surrounding area of the housing 19 or simply be a continuation of the same material comprising the housing and of substantially a continuous contour with the surrounding area, assuming the material has acceptable optical properties for successfully transmitting the light beams from the light beam assemblies. If the lenses are distinct, they may be Fresnel lenses or other types of conventional optical lenses or reflectors. The lenses may either comprise material that is the same or different from the material comprising the housing 19. In the illustrated embodiment, the lower shell of the housing 19 comprises material of good optical properties and, therefore, the lenses are simply continuations of the areas surrounding the lenses and visually are not distinct from other parts of the lower shell.

Each of the circuit boards is fastened to the lower shell of the housing 19 in the illustrated embodiment. However, for different types of housings, the circuit boards may be fastened to the tops or sides and a combination of top, bottom and sides. In any event, either the fasteners themselves or other alignment devices serve as keys to register the placement of the circuit boards into the interior of the shell of the housing 19 so that the light beam assemblies 67 and 85 are automatically aligned with the lenses of the housing 19. The fasteners can be any of several types of connectors. For example, they can be snap on type connectors or they may be screws as shown in the illustrated embodiment in FIG. 7. The keys in the circuit boards and in the housing 19 ensure proper lateral alignment of the circuit boards within the interior space of the housing 19. For proper vertical alignment, the illustrated embodiment relies on the proper height dimensioning of posts molded into the lower shell of the housing 19.

Figure 7:
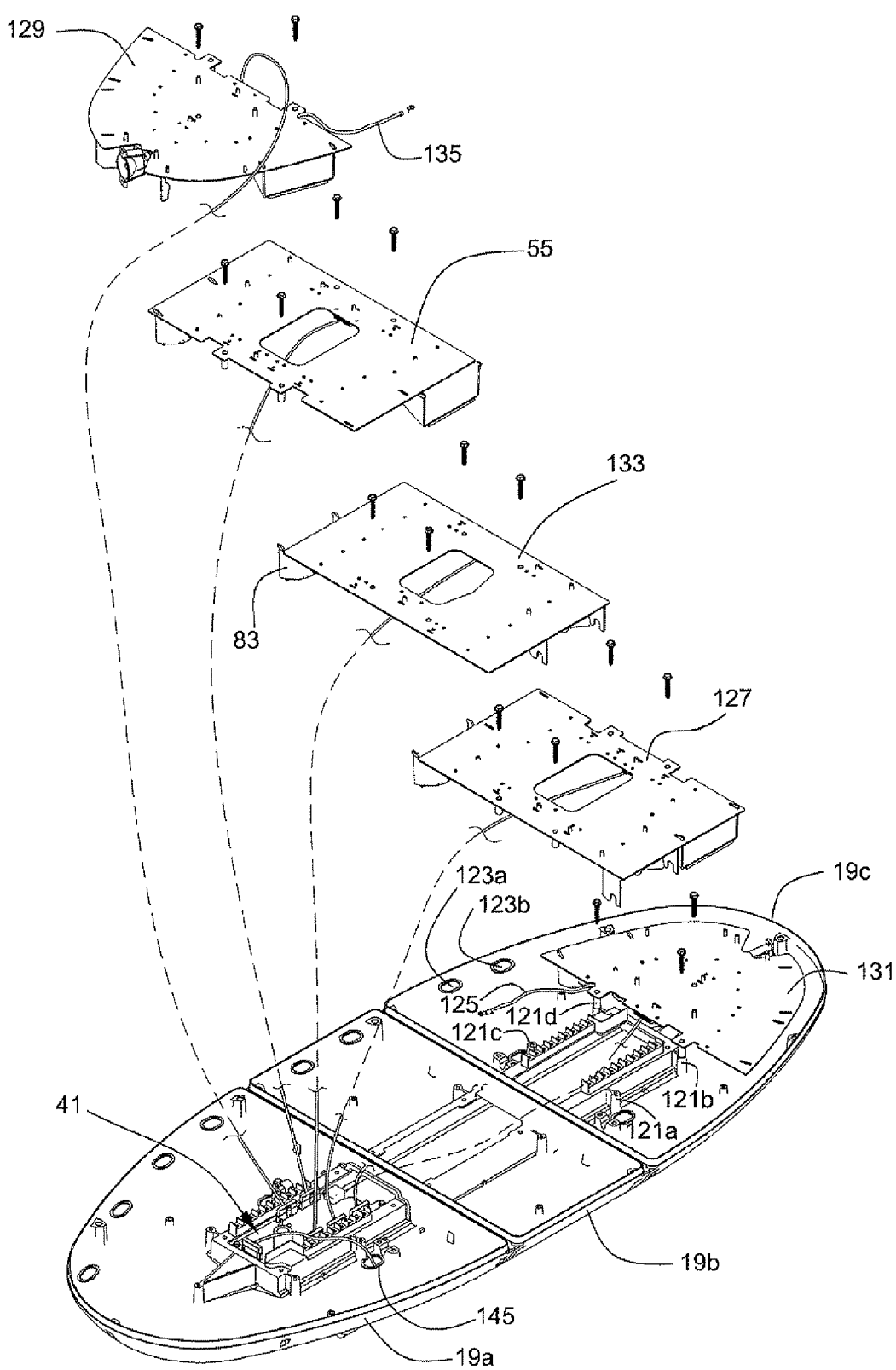

Referring again to the circuit board 55 in FIG. 6, pilot holes 119a, 119b, 119c and 119d comprise a key for the registering the circuit board to section 19c of the lower shell of the housing 19 as best illustrated in FIG. 7. Pilot holes in vertical posts 121a, 121b, 121c and 121d in the housing section 19c in FIG. 7 serve as a pattern of keys that complements the pattern of keys formed by pilot holes 119a, 119b, 119c and 119d in the circuit board 55 to ensure proper placement of the circuit board in the housing section and the registration of light beam assemblies with the housing's lenses. Two of the lenses are identified in the illustration of FIG. 7 and numbered 123a and 123b. When the circuit board is mounted to section 19c of the housing 19 the light beam assemblies 67 and 85 are automatically registered in place with the lenses 123a and 123b, respectively.

In the illustrated embodiment, stand offs 125a, 125b, 125c and 125d mate with the pilot holes 119a, 119b, 119c and 119d in order to vertically align the circuit board 55. However, those skilled in the art will appreciate that the stand offs are dictated only by the details of the mechanical construction of the illustrated embodiment and are not a necessary aspect of the invention.

Figure 6A:
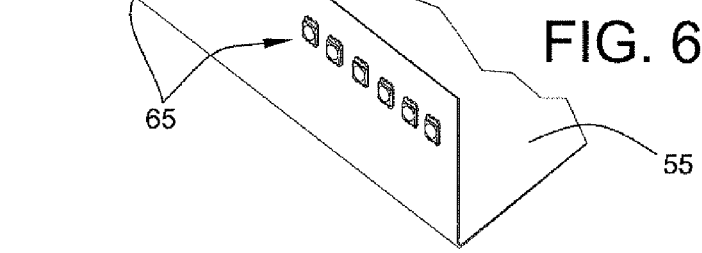
FIG. 6a illustrates an alternative embodiment for the circuit board in FIG. 6 in which an edge of the board is turned at a right angle to orient light emitting diodes (LEDs) mounted in the board such that light beams from the LEDs directly radiate through lenses of the light bar housing without being re-oriented by reflectors as required by the planar board of FIG. 6.

Although the circuit board 55 is illustrated in FIG. 6 as being substantially planar in its shape, it may also be fabricated to have angled sections for structural support and/or for orienting light sources to more effectively broadcast their light beams. For example, FIG. 6a illustrates how the circuit board 55 may be fabricated to be angled at least at one of its ends 56 to orient the LEDs 65 and their light beams for directly radiating in a horizontal direction without requiring the reflect 68 in the board 55 of FIG. 6.

In the illustrated embodiment as shown in FIG. 7, each of the end sections 19a and 19c of the housing 19 receive two circuit boards. A total of five circuit boards (including board 55) similar in construction to circuit board 55 are secured to the sections 19a, 19b and 19c of the housing 19 in order to provide a full array of light beam assemblies in the housing. The shapes of the circuit boards in one of the end sections 19a and 19c are mirror images of the shapes of the boards in the other section. Thus, circuit board 55 illustrated and discussed in detail in connection with FIG. 6 is mounted into section 19a of the housing 19. A circuit board 127 of the same size and shape fits into a mirrored position in section 19c of the housing 19. Similarly, a circuit board 129 is mounted into the end section 19a and a circuit board 131 of the same size and shape fits into a mirrored position in section 19c. A fifth circuit board 133 is mounted into the center section 19b of the housing 19.

Each of the circuit boards 55, 127, 129 131 and 133 is grounded to the frame 17 that extends through the sections 19a, 19b and 19c through the section's openings 27, 25 and 29, respectively. Because the openings do not extend under the end circuit boards 129 and 131, each of these circuit boards includes a ground wire 135 extending from the board to the frame 17.

In order to hold the circuit boards 55, 127, 129, 131 and 133 in the housing and ensure their proper alignment for registering the light beam assemblies to the lenses of the housing, screws 137 shown in FIG. 7 are threaded into the pilot holes formed by aligning the pilot holes of the circuit boards with the complementary pilot holes in the vertical posts of the housing sections 19a, 19b and 19c. Specifically, each of the circuit boards 127, 129, 131 and 133 is configured similarly to the circuit board 55 described in detail above. Just as the screws 137 fasten the circuit board 55 to secure and properly align the circuit board in section 19a of the housing 19, they provide the same function for the other circuit boards 127, 129, 131 and 133.

After each of the circuit boards 55, 127, 129, 131 and 133 has been populated with light beam assemblies in a manner in keeping with the population of the circuit board 55 as described above, the boards are registered to the housing 19 using the patterns of keys comprising the pilot holes and then secured by fasteners such as the screws 137. In addition to the mechanical assembly of the light bar 11, cables connect each of the boards 55, 127, 129, 131 and 133 to the controller 41 in order to bring power and control signals to each board. For example, in FIG. 6 the connector 27 is mated to the end connector 81 of the cable 83. As best seen in FIG. 7, the cable 83 connects the circuit board 55 to a connector 141 (See FIG. 5) mounted to the circuit board of the controller 41. Each of the other circuit boards 127, 129, 131 and 133 also is associated with a cable that connects the board to the controller 41 is substantially the same way as described in detail for circuit board 55.

Once the boards are mechanically and electrically secured to the lower sections 19a, 19b and 19c of the housing 19, the upper section 19d of the housing comprising an upper shell of the housing is fastened to the lower shell comprising the assembled lower sections as best illustrated in FIG. 8. Cabling from a power source such as the battery 53 and control signals from the control head 35 are threaded through a hole 145 to the controller 41, where the cables connect to a connector 147 (See FIG. 5).

Figure 9:
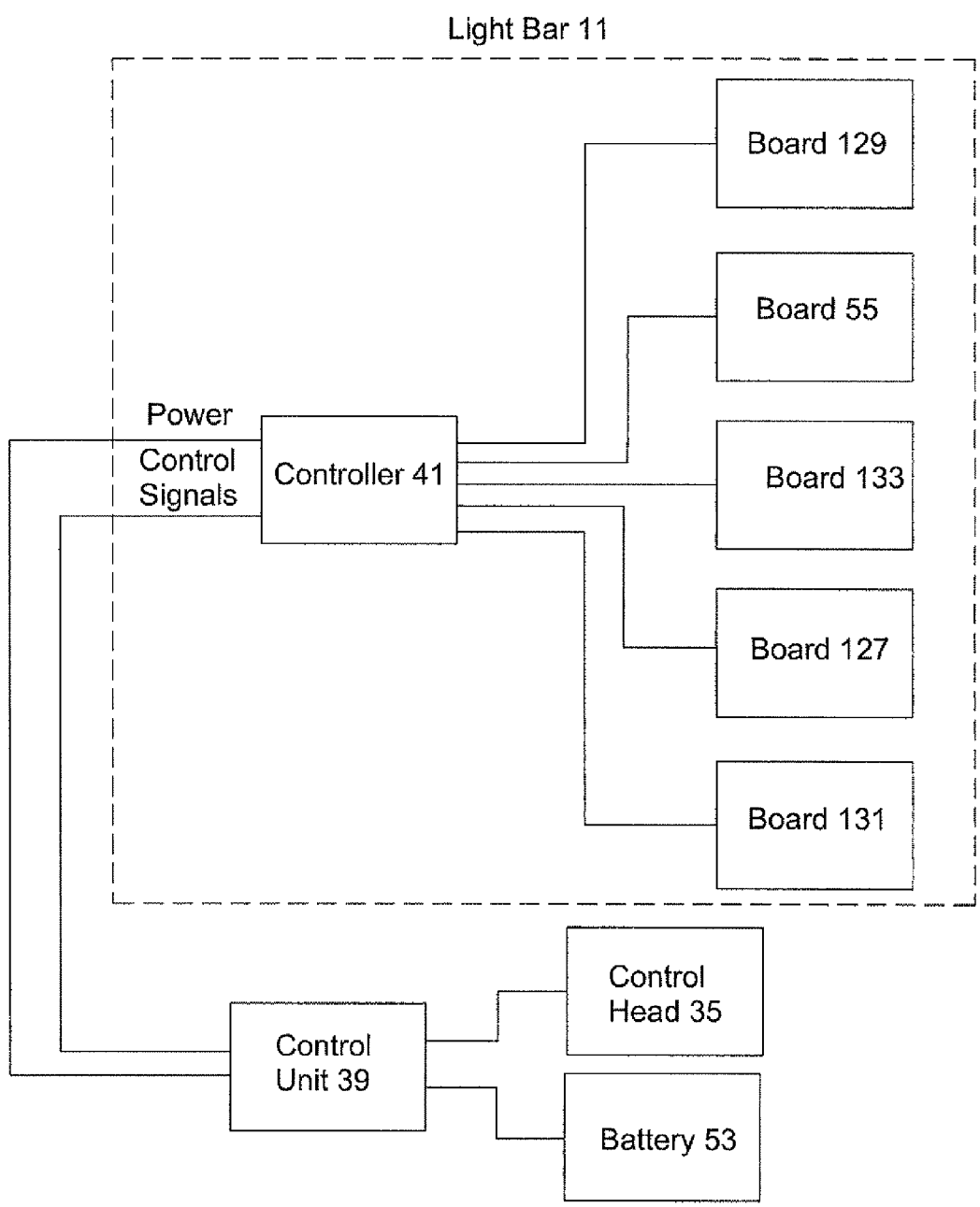

Referring to FIG. 9, each of the circuit boards 127, 129, 131 and 133 includes a connector substantially like the connector 77 of circuit board 55 in FIG. 6 that mates to a connector of a cable communicating power and control signals to the circuit board. As best seen in FIGS. 5 and 7, the circuit board of the controller 41 includes a connector for coupling to a cable from each of the circuit boards 55, 127, 129, 131 and 133 that are populated with light beam assemblies. Thus, the circuit board for the controller 41 includes five connectors for coupling to five cables from the five circuit boards 55, 127, 129, 131 and 133. A sixth connector 147 on the circuit board of the controller 41 connects to a cable from the control unit 39 that delivers power and control signals to the light bar 11.

Figure 10:
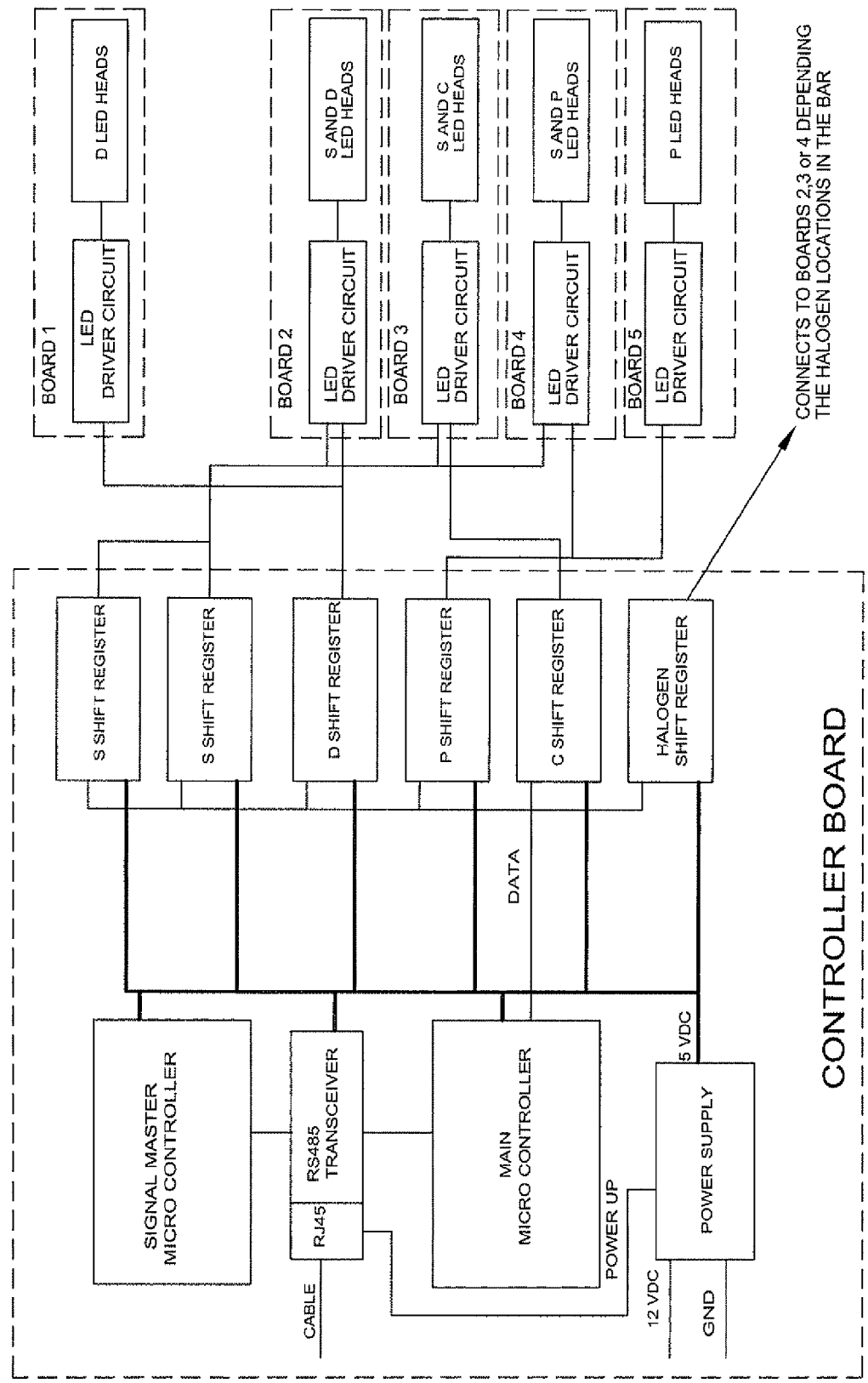
FIG. 10 is a schematic diagram of the controller in FIG. 5.

Referring to FIG. 10, the controller 41 interprets a serial stream of input data generated by keystrokes to the keyboard 47 of the control head 35. The serial data includes information identifying one of several available flash patterns for one or more of the light beam assemblies. The flash patterns are stored as data in a memory in the controller 41.

The RS485 transceiver sends and receives balanced, digital signals through the RJ45 connector. The transceiver takes the difference of the received signals and passes the result to the main microcontroller and the Signalmaster™ microcontroller in the form of a single ended digital data stream. The Signalmaster™ microcontroller is a product of Federal Signal Corporation of Oak Brook, Ill.

Based upon the data received in the stream, each of the microcontrollers in FIG. 10 acts based upon embedded software. Examples of functions performed by the microcontroller include sending serial flash pattern streams to the shift registers to create a preprogrammed flash pattern. Other examples include powering down the light bar's circuitry to minimize parasitic current when the system is not being used.

The shift registers store the pattern data for each clock cycle and output a digital control signal to the LED drive circuitry. This control signal tells the LED circuitry to activate the LEDs or keep them in an OFF state. Combinations of these digital control signal streams going to multiple heads/LED drive circuits create the random or synchronized visual light patterns commonly seen in the patterns created by light bars.

Figure 11:
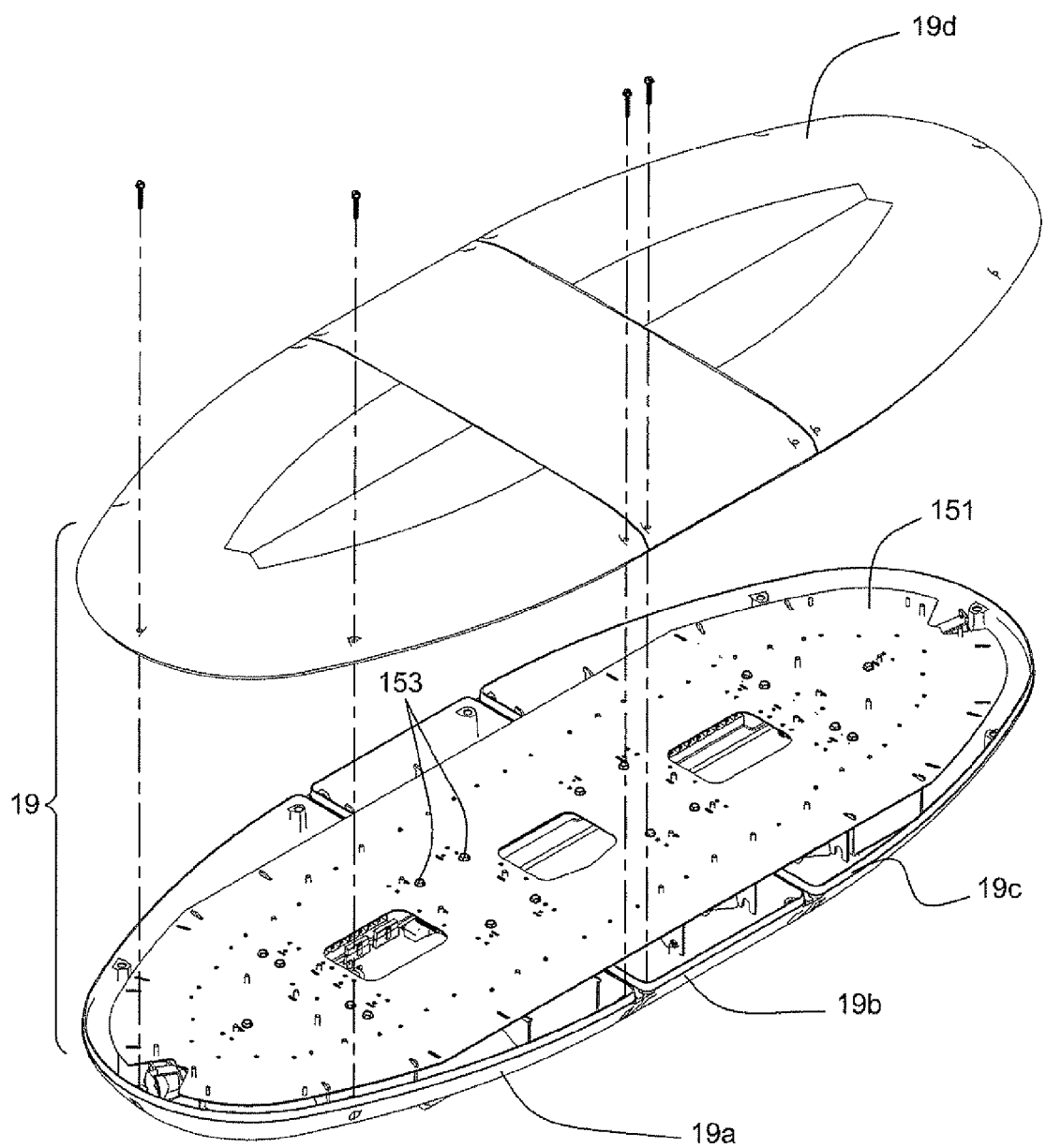
FIG. 11 illustrates an alternative embodiment of the invention wherein the five circuit boards in FIGS. 2-8 are replaced with a single monolithic circuit board.

In the illustrated embodiment of FIGS. 2-8, five discrete circuit boards are assembled into the housing 19 in order to position and secure all of the light beam assemblies. As an alternative, FIG. 11 illustrates the same housing 19 except a single monolithic circuit board 151 is secured to the lower shell comprising sections 19a, 19b and 19c. Like the five discrete circuit boards illustrated in FIGS. 2-8, the single circuit board 151 of FIG. 11 includes a pattern of keys that mate to a pattern of keys in the interior of the bottom shell of the housing 19 so that the light beam assemblies populating the circuit board precisely register with the lenses of the housing 19. Like the embodiment of FIGS. 2-8, the keys in the embodiment of FIG. 11 comprise pilot holes that align with pilot holes in the sections 19a, 19b and 19c of the housing 19. Fasteners, shown as screws 153 in FIG. 11, secure the circuit board 151 in the housing and maintain the proper registration of the board provided when the pilot holes are aligned.

Figure 12:
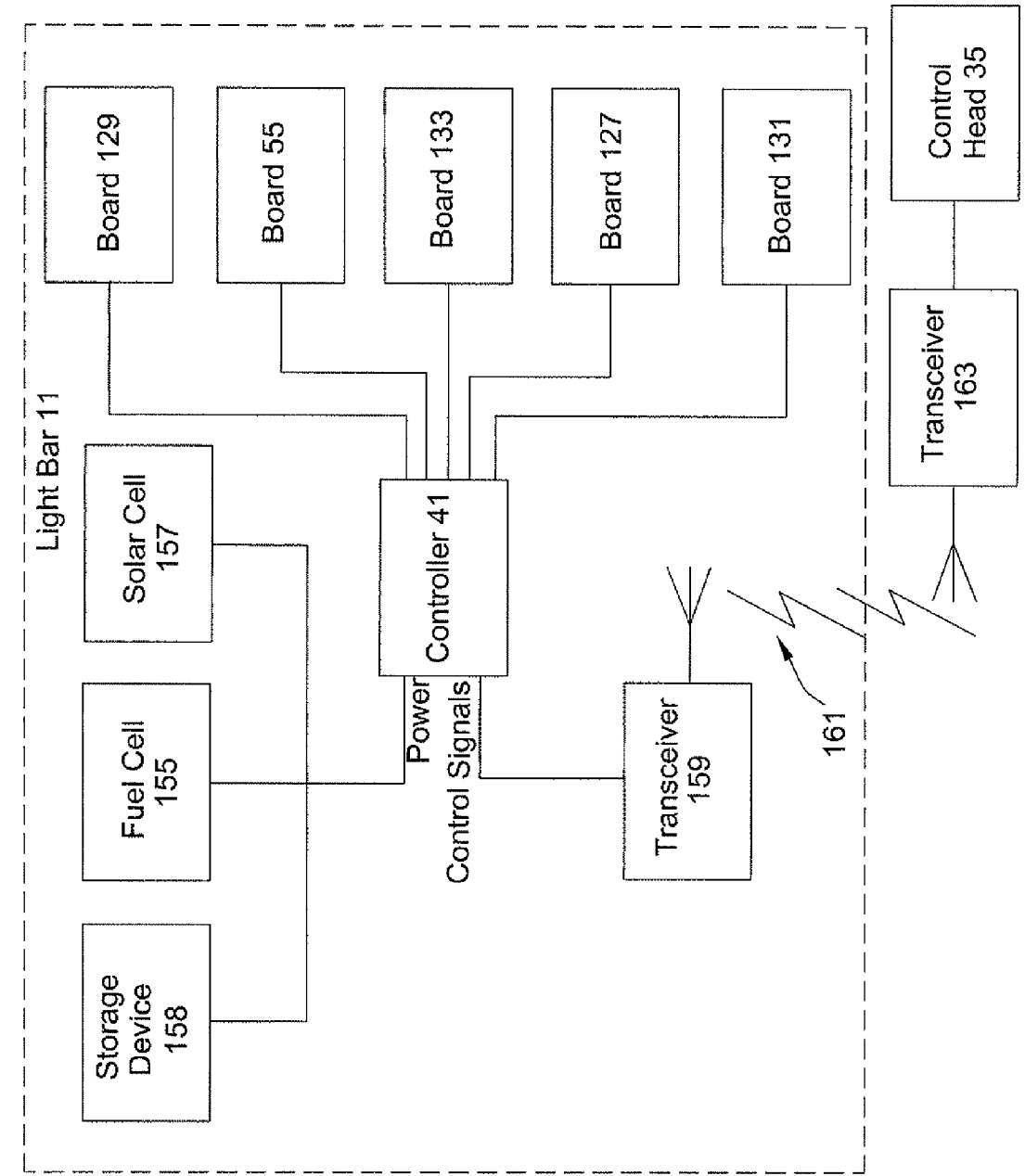
FIG. 12 illustrates a further alternative embodiment in which external power and signaling cables running to the light bar are eliminated by providing one or more power sources resident in the light bar and wireless receiver circuitry for receiving small signal commands from a remote control source.

In a further alternative embodiment, power to the circuit boards in FIGS. 2-8 or the single board in FIG. 11 is provided by power sources local to the light bar 11, thereby eliminating the need to provide a power cable from the vehicle 13 to the light bar 11. For example, as illustrated in FIG. 12, one or both of a fuel cell 155 and an array of solar cells 157 generate sufficient energy to power all of the electronics in the light bar 11. A suitable hydrogen fuel cell is Nab II available from Jadoo Power Systems of Folsom, Calif. and suitable solar cells are available from BP Solar of Warrenville, Ill. The fuel cell 155 is mounted to an interior space of the light bar 11, whereas the array of solar cells 157 is mounted to an external surface of the light bar such as the top section 19*d* of the housing 19 in FIGS. 1, 8 and 11. Of course, both the fuel cell 155 and the array of solar cells 157 can be located elsewhere and even on the vehicle 13 itself.

There may be times when the solar cells 157 produce energy that is not immediately used by the light bar 11. In those situations, an energy storage device 158 stores the energy so that it can be later used by the light bar. For example, the solar cells may produce more energy than used by the light bar during a sunny day. That unused energy is stored in the storage device 158 and used when the solar cell is unable to provide sufficient power such as in the evening or during cloudy day conditions. Of course, the fuel cell 155 can also supplement the solar cells, but it cannot be easily charged with the unused energy from the solar cells 157, thus requiring a storage device 158 such as a battery or the previously identified ultra capacitor. In order to orchestrate the storage of energy and the delivery of the energy to the light bar from among the three sources of the fuel cell 155, the array of solar cells and the storage device, an appropriate power supply circuit switches among or blends the energy from these sources. The power supply circuit (not shown) can be made part of the controller 41 or constructed separately.

As a further alternative, the light bar 11 can be made completely wireless by providing a transceiver 159 (FIG. 12) with the controller 41 so that the control signal from the control head 35 are delivered to the controller 41 as electromagnetic signals 161, which are preferably short range radio frequency signals. The control head 35 provides its control signals to a transceiver 163, which broadcasts the control signals as low power RF signals to the transceiver 159. For example, the electromagnetic link 161 between the controller 41 and the control head 35 may be in accordance with the well known Bluetooth protocol, which is maintained by the Institute of Electrical and Electronic Engineers (IEEE) as its 802.15.1 standard. However, those familiar with low power RF communications will appreciate that many other communications protocols can be used, including other IEEE standards. Those skilled in the art of short distance wireless communications will appreciate that a receiver may be substituted for the transceiver 159 if the communications path is one way between the control head 35 and the controller 41. Likewise, a transmitter may be substituted for the transceiver 163.

As a still further alternative embodiment, depending on the configuration of the interior space of the light bar 11, the circuit boards 55, 127, 129, 131 and 133 may be populated on both sides with light beam assemblies as suggested by the illustration of the circuit board 55' in FIG. 13. In FIG. 13, the circuit board 55' is substantially like the circuit board 55 in FIG. 6 except circuit board 55' has been fabricated to include LEDs in all of the four areas or stations 57*a*, 57*b*, 57*c* and 57*d*. In contrast, the board 55 in FIG. 6 is fabricated to support LED light beam assemblies 67 in two of the four areas or stations and halogen light beam assemblies 85 in the other two areas or stations for mounting light beam assemblies. In FIG. 6, the underside of the circuit board 55 is simple a ground plane. The underside of the circuit board 55', however, is fabricated to provide four additional areas or stations, each shown in FIG. 13 to support a LED light beam assembly 67 (only three are visible). Of course, in keeping with the invention, each of the eight areas of the circuit board 55' can be fabricated to support any type of light beam assembly. The light beam assemblies are mounted to the circuit board 55' and precisely registered on the board in the same way as described above in connection with the board 55. Likewise, the board 55 is secure into the light bar housing in keeping with the approach taken in the embodiment in FIGS. 2-8, which results in the light beam assemblies being positioned in precise registration with the lenses of the housing.

In addition to the alternative configuration of the circuit boards themselves as illustrated in FIGS. 6*a* and 13, the physical relationship among the circuit boards may be other than the co-planar relationship of the illustrated embodiment. For example, the circuit boards may be stacked to provide multiple levels of lights in the light bar. Still other modifications to the configuration of each circuit board and their relative orientation will be appreciated by those skilled the art of emergency signaling devices such as light bars.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An emergency light for a vehicle comprising:
  a housing having lenses for transmitting light from an interior of the housing;
  one or more circuit boards within the housing, each circuit board having a planar surface extending toward two or more of the lenses for supporting two or more light beam assemblies such that each assembly is aligned with one of the lenses;

each of the circuit boards having;
- one or more connectors mounted for electrically communicating with the two or more light beam assemblies by way of electrical connections fabricated on the circuit board; and
- a first set of patterns of alignment keys for registering the two or more light beam assemblies to the circuit board so that the light beam assemblies are fastened to the circuit board at positions predetermined by the patterns; and a second set of patterns of alignment keys in the housing for positioning each of the circuit boards within the housing at a predetermined location that automatically aligns the two or more light beam assemblies fastened to each of the circuit boards with the lenses of the housing when the circuit boards are fastened to the housing, thereby enabling each of the lenses to cooperate with a corresponding aligned light beam assembly to broadcast a light beam alerting observers of the vehicle to an emergency condition.

2. The emergency light of claim 1 including an energy source for all energy consuming devices within the housing, including light generating devices that are either associated with or part of the two or more light beam assemblies, where the energy source and the housing are mated such that the energy consuming devices operate without requiring electrical wiring from the housing to an electrical system for the vehicle.

3. The emergency light of claim 2 wherein the energy source includes solar cells that convert solar energy to electrical energy and provide the electrical energy to (a) the energy consuming devices and (b) to an energy storage device within the housing when all of the electrical energy generated by the solar cells is not required by the energy consuming devices.

4. The emergency light of claim 3 wherein the light generating devices are light emitting diodes (LEDs) mounted to the one or more circuit boards.

5. The emergency light of claim 1 wherein the light beam assemblies include means for shaping light from light generating devices into the light beams.

6. The emergency light of claim 1 including a receiver within the housing for wireless communication with a user interface located in a passenger compartment of the vehicle.

7. The emergency light of claim 1 including:
an energy source for energy consuming devices within the housing, including light generating devices either associated with or part of the light beam assemblies, where the energy source is mated with the housing such that the energy consuming devices operate without requiring wiring between the housing and an electrical system for the vehicle; and a receiver within the housing for wireless communication with a user interface located in a passenger compartment of the vehicle, enabling the energy consuming devices to be controlled without requiring wiring between the housing and the user interface.

8. The emergency light of claim 1 wherein the housing is elongated to extend across a roof of a vehicle such that the emergency light is a light bar for mounting to a roof of a vehicle.

9. The emergency light of claim 1 wherein the alignment keys in the circuit boards for the first and second sets of patterns are holes in the circuit boards.

10. The emergency light of claim 1 wherein at least one of the light beam assemblies is a beam shaping device whose predetermined position on the circuit board optically aligns the beam shaping device with a source of light supported on the circuit board.

11. The emergency light of claim 1 wherein the predetermined position on the circuit board includes at first and second patterns of the first set of patterns with each of the first and second patterns complementing a pattern of alignment keys for a different type of light beam assembly, such that light beam assemblies of different types may be alternatively fastened to the circuit board at the predetermined position.

12. The emergency light of claim 1 wherein the one or more circuit boards are thermally conductive circuit boards that both communicate control signals to the one or more light beam assemblies and sink heat generated by the assemblies.

13. The emergency light of claim 1 wherein the one or more circuit boards are two or more circuit boards each connected to another by a wiring harness.

14. The emergency light of claim 1 wherein light emitting diodes (LEDs) are mounted directly to at least one of the one or more circuit boards and cooperate with a beam shaping device comprising one of the light beam assemblies to generate the light beam.

15. The emergency light of claim 1 wherein the one or more circuit boards is at least two circuit boards mounted in the housing to be substantially side-by-side and co-planar.

16. The emergency light of claim 1 wherein the one or more circuit boards includes a ground plane that divides an interior of the housing into two electrically isolated spaces when the circuit boards are attached to the housing, with each of the ground plane effectively shielding one of the spaces from any electromagnetic disturbance caused by operation of devices in the other space.

* * * * *